(12) United States Patent
Fentzlaff et al.

(10) Patent No.: US 11,519,631 B2
(45) Date of Patent: Dec. 6, 2022

(54) HVAC CONTROL SYSTEM WITH ADAPTIVE FLOW LIMIT HEAT EXCHANGER CONTROL

(71) Applicant: Johnson Controls Technology Company, Auburn Hills, MI (US)

(72) Inventors: Brennan H. Fentzlaff, Oconomowoc, WI (US); Kirk H. Drees, Cedarburg, WI (US); Timothy I. Salsbury, Mequon, WI (US); John M. House, Saint-Leonard (CA)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 205 days.

(21) Appl. No.: 16/740,031

(22) Filed: Jan. 10, 2020

(65) Prior Publication Data
US 2021/0215384 A1    Jul. 15, 2021

(51) Int. Cl.
| | | |
|---|---|---|
| *F24F 11/84* | (2018.01) |
| *F28F 27/02* | (2006.01) |
| *F16K 37/00* | (2006.01) |
| *F24F 11/58* | (2018.01) |
| *F24F 11/64* | (2018.01) |

(52) U.S. Cl.
CPC ............ *F24F 11/84* (2018.01); *F16K 37/005* (2013.01); *F24F 11/58* (2018.01); *F24F 11/64* (2018.01); *F28F 27/02* (2013.01)

(58) Field of Classification Search
CPC .. F24F 11/84; F24F 11/64; F24F 11/63; F16K 37/005
See application file for complete search history.

(56) References Cited

U.S. PATENT DOCUMENTS

| | | | |
|---|---|---|---|
| 8,825,185 B2 | 9/2014 | Salsbury | |
| 9,435,557 B2 | 9/2016 | Albrecht et al. | |
| 9,631,831 B2 | 4/2017 | Thuillard et al. | |
| 9,746,199 B1 | 8/2017 | Drees et al. | |
| 9,874,880 B2 | 1/2018 | Thuillard et al. | |
| 10,359,208 B2 | 7/2019 | Drees et al. | |
| 2004/0112037 A1* | 6/2004 | Yagi | F02C 7/10 |
| | | | 60/39.3 |
| 2011/0114304 A1 | 5/2011 | Keller | |
| 2014/0150483 A1* | 6/2014 | Takayama | F25B 30/02 |
| | | | 62/160 |

(Continued)

OTHER PUBLICATIONS

U.S. Appl. No. 16/115,508, filed Aug. 28, 2018, Noboa et al.
U.S. Appl. No. 16/447,783, filed Jun. 20, 2019, Glanzer et al.
U.S. Appl. No. 16/447,813, filed Jun. 20, 2019, Glanzer et al.

*Primary Examiner* — Nelson J Nieves
(74) *Attorney, Agent, or Firm* — Foley & Lardner LLP

(57) ABSTRACT

An adaptive flow limit controller for controlling a flow rate of a fluid through a heat exchanger includes a processing circuit. The processing circuit is configured to use an adaptive model to determine a threshold flow rate of the fluid through the heat exchanger at which a gradient of a temperature difference of the fluid across the heat exchanger with respect to the flow rate of the fluid through the heat exchanger has a threshold gradient value. The processing circuit is configured to operate a flow control device to maintain the flow rate of the fluid of through the heat exchanger at less than or equal to the threshold flow rate.

14 Claims, 16 Drawing Sheets

(56) References Cited

U.S. PATENT DOCUMENTS

| | | | |
|---|---|---|---|
| 2015/0323209 A1* | 11/2015 | Khiani | F24F 11/30 |
| | | | 700/276 |
| 2017/0198945 A1* | 7/2017 | Azuma | F25B 47/006 |
| 2017/0295058 A1 | 10/2017 | Gottschalk et al. | |
| 2018/0238577 A1 | 8/2018 | Drees et al. | |
| 2018/0239371 A1 | 8/2018 | Drees et al. | |
| 2019/0191729 A1* | 6/2019 | Schwenzow | A23L 2/46 |
| 2019/0353385 A1 | 11/2019 | Aucoin et al. | |
| 2020/0080743 A1* | 3/2020 | Cimberio | F24D 19/1015 |
| 2021/0208611 A1 | 7/2021 | Trikha et al. | |

* cited by examiner

HVAC CONTROL SYSTEM WITH ADAPTIVE FLOW LIMIT HEAT EXCHANGER CONTROL

BACKGROUND

The present disclosure relates generally to the field of building management systems and associated devices and more particularly to systems and methods for determining and enforcing a threshold flow limit in an adaptive flow limit valve assembly. An adaptive flow limit valve assembly includes a controller that determines the optimal threshold flow rate based on a variety of factors and controls a valve position based on a flow command received from an external control device and a flow rate measurement received from a flow rate sensor.

Heating, ventilation, and air conditioning (HVAC) systems use heat exchangers to transfer energy between liquid and air. The conditioned air is then supplied to a building to maintain temperature and/or humidity control in those zones. When heat exchangers operate at high fluid flow rates, the HVAC system as a whole (e.g., the pumps, chillers, coils/heat exchangers, etc.) may operate inefficiently due to several contributing factors. First, as fluid flow rate increases through a heat exchanger, the amount of heat transfer may asymptote to a maximum amount. Operating at large flow rates may result in diminishing returns. For example, the HVAC system may consume considerable energy to move the fluid at the high flow rate, yet may only experience marginal additional heat transfer as a result. Additionally, when the HVAC system operates at large or high flow rates, a temperature difference across the coil may be decreased (since the fluid spends less time in the heat exchanger and therefore has less time for its temperature to change due to heat transfer). This results in the temperature of the fluid returning to the chiller being relatively close or substantially equal to the temperature of fluid leaving the chiller. Depending on chiller plant setup and controls, this may require additional chillers being sequenced on (to change the temperature of the fluid), thereby increasing power consumption. To combat inefficient operation at large fluid flow rates, valves can be used to enforce a threshold flow setting and/or minimum $\Delta T$ settings.

While the previously mentioned solutions begins to address the inefficiency of operating at high water flows, it requires that a user or technician be knowledgeable enough about the system to set the threshold flow setting or minimum $\Delta T$ setting appropriately. If these values are set incorrectly, the system will not operate efficiently or correctly. The present disclosure aims to automatically determine an adaptive limiting flow value such that a user or technician is no longer required to set explicit threshold flow and minimum $\Delta T$ settings.

SUMMARY

One implementation of the present disclosure is an adaptive flow limit controller for controlling a flow rate of a fluid through a heat exchanger, according to some embodiments. In some embodiments, the controller includes a processing circuit configured to use an adaptive model to determine a threshold flow rate of the fluid through the heat exchanger at which a gradient of a temperature difference of the fluid across the heat exchanger with respect to the flow rate of the fluid through the heat exchanger has a threshold gradient value. In some embodiments, the processing circuit is configured to operate a flow control device to maintain the flow rate of the fluid of through the heat exchanger at less than or equal to the threshold flow rate.

In some embodiments, the adaptive model defines a relationship between the temperature difference of the fluid across the heat exchanger and the flow rate of the fluid through the heat exchanger as a function of an adaptive model parameter.

In some embodiments, the processing circuit is configured to update an adaptive model parameter of the adaptive model using one or more measurements of the temperature difference of the fluid across the heat exchanger and the flow rate of the fluid through the heat exchanger.

In some embodiments, the gradient of the temperature difference of the fluid across the heat exchanger with respect to the flow rate of the fluid through the heat exchanger is a function of both the flow rate of the fluid through the heat exchanger and an adaptive model parameter of the adaptive model such that the threshold gradient value corresponds to a first threshold flow rate of the fluid through the heat exchanger when the adaptive model parameter has a first parameter value. In some embodiments, the gradient is a function of both the flow rate and the adaptive model parameter such that the threshold gradient value corresponds to a second threshold flow rate of the fluid through the heat exchanger, different from the first threshold flow rate, when the adaptive model parameter has a second parameter value different from the first parameter value.

In some embodiments, the threshold gradient value is a predetermined value stored in memory of the adaptive flow limit controller.

In some embodiments, the processing circuit is configured to generate the threshold gradient value as a function of a first gradient value and a second gradient value. In some embodiments, the first gradient value prioritizes energy consumption and corresponds to a first temperature difference of the fluid across the heat exchanger. In some embodiments, the second gradient value prioritizes occupant comfort and corresponds to a second temperature difference of the fluid across the heat exchanger, the second temperature difference being less than the first temperature difference.

In some embodiments, the processing circuit is configured to generate the threshold gradient value as a function of a user-adjustable weight that indicates a priority of energy consumption relative to occupant comfort.

Another implementation of the present disclosure is a method for controlling a flow rate of a fluid through a heat exchanger, according to some embodiments. In some embodiments, the method includes using an adaptive model to determine a threshold flow rate of the fluid through the heat exchanger at which a gradient of a temperature difference of the fluid across the heat exchanger with respect to the flow rate of the fluid through the heat exchanger has a threshold gradient value. In some embodiments, the method includes operating a flow control device to maintain the flow rate of the fluid of through the heat exchanger at less than or equal to the threshold flow rate.

In some embodiments, the adaptive model defines a relationship between the temperature difference of the fluid across the heat exchanger and the flow rate of the fluid through the heat exchanger as a function of an adaptive model parameter.

In some embodiments, the method further includes updating an adaptive model parameter of the adaptive model using one or more measurements of the temperature difference of the fluid across the heat exchanger and the flow rate of the fluid through the heat exchanger.

In some embodiments, the gradient of the temperature difference of the fluid across the heat exchanger with respect to the flow rate of the fluid through the heat exchanger is a function of both the flow rate of the fluid through the heat exchanger and an adaptive model parameter of the adaptive model such that the threshold gradient value corresponds to a first threshold flow rate of the fluid through the heat exchanger when the adaptive model parameter has a first parameter value. In some embodiments, the gradient of the temperature difference is a function of both the flow rate and the adaptive model parameter such that the threshold gradient value corresponds to a second threshold flow rate of the fluid through the heat exchanger, different from the first threshold flow rate, when the adaptive model parameter has a second parameter value different from the first parameter value.

In some embodiments, the threshold gradient value is a predetermined value stored in memory of the adaptive flow limit controller.

In some embodiments, the method includes generating the threshold gradient value as a function of a first gradient value and a second gradient value. In some embodiments, the first gradient value prioritizes energy consumption and corresponds to a first temperature difference of the fluid across the heat exchanger. In some embodiments, the second gradient value prioritizes occupant comfort and corresponds to a second temperature difference of the fluid across the heat exchanger, the second temperature difference being less than the first temperature difference.

In some embodiments, the method further includes generating the threshold gradient value as a function of a user-adjustable weight that indicates a priority of energy consumption relative to occupant comfort.

Another implementation of the present disclosure is an adaptive flow limit controller for controlling a flow rate of a fluid through a heat exchanger, according to some embodiments. In some embodiments, the controller includes a processing circuit configured to determine a threshold flow rate of the fluid through the heat exchanger using an objective function that defines a total objective as a function of a first objective and a second objective. In some embodiments, the first objective is based on an amount of energy consumption required to achieve the threshold flow rate of the fluid through the heat exchanger. In some embodiments, the second objective is based on an occupant comfort predicted to result from the threshold flow rate of the fluid through the heat exchanger. In some embodiments, the processing circuit is configured to operate a flow control device to maintain the flow rate of the fluid of through the heat exchanger at less than or equal to the threshold flow rate.

In some embodiments, the objective function includes a weight parameter that indicates a priority of the amount of energy consumption required to achieve the threshold flow rate of the fluid through the heat exchanger relative to the occupant comfort predicted to result from the threshold flow rate of the fluid through the heat exchanger.

In some embodiments, the processing circuit is configured to determine the threshold flow rate using a first model and a second model. In some embodiments, the first model defines a relationship between the flow rate of the fluid through the heat exchanger and an amount of energy consumption required to achieve the flow rate of the fluid through the heat exchanger. In some embodiments, the second model defines a relationship between the flow rate of the fluid through the heat exchanger and occupant comfort predicted to result from the flow rate of the fluid through the heat exchanger.

In some embodiments, both the amount of energy consumption required to achieve the threshold flow rate of the fluid through the heat exchanger and the occupant comfort predicted to result from the threshold flow rate of the fluid through the heat exchanger are functions of the threshold flow rate. In some embodiments, the processing circuit is configured to determine the threshold flow rate by performing an optimization of the objective function.

In some embodiments, the processing circuit is configured to determine the threshold flow rate by performing an optimization of the objective function such that the threshold flow rate value represents an optimal tradeoff between energy consumption and occupant comfort.

In some embodiments, the first objective represents a cost of the energy consumption required to achieve the threshold flow rate of the fluid through the heat exchanger and the second objective represents a cost of occupant discomfort predicted to result from the threshold flow rate of the fluid through the heat exchanger.

DETAILED DESCRIPTION

Overview

Figure 1:
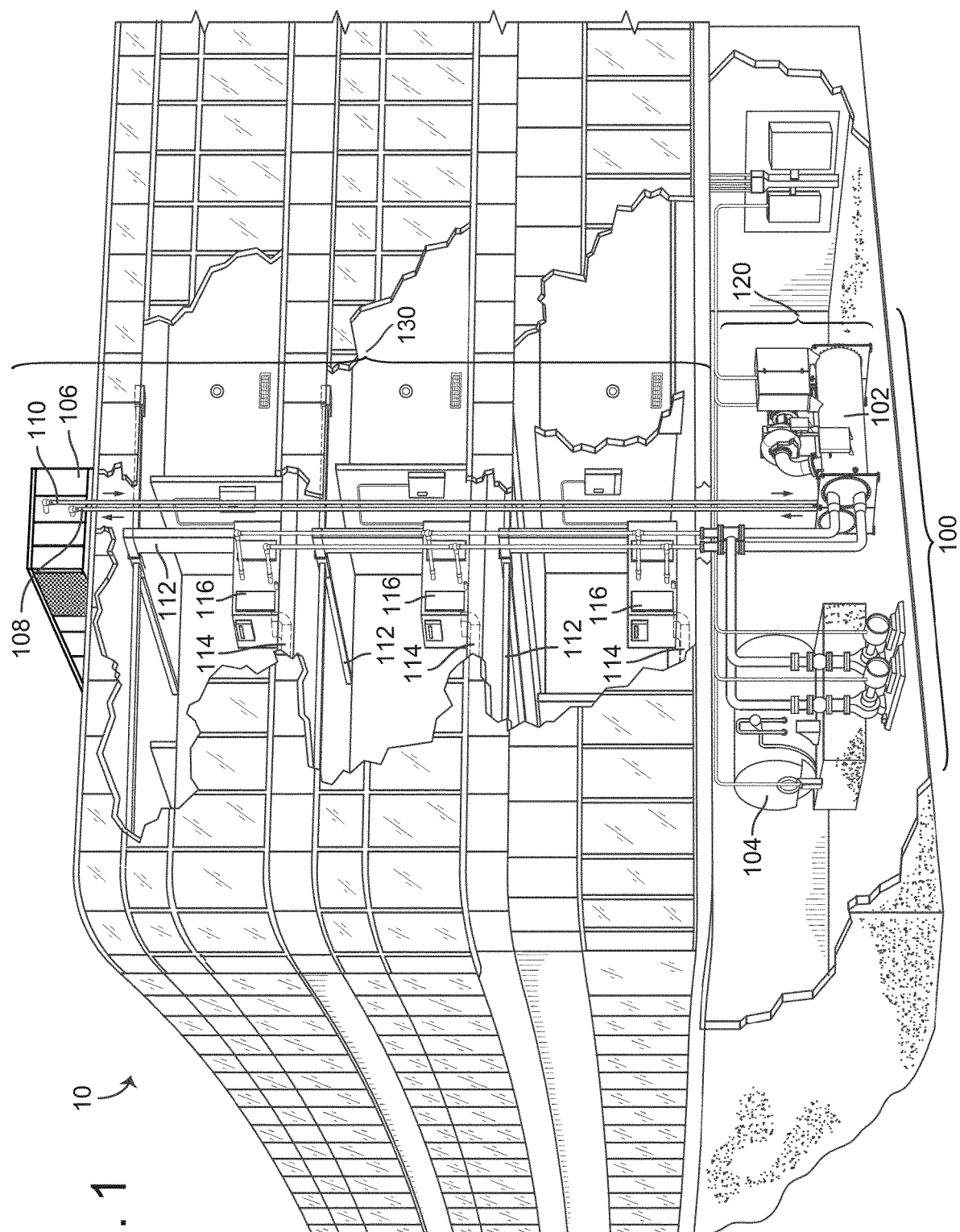
FIG. 1 is a drawing of a building equipped with a heating, ventilating, or air conditioning (HVAC) system and a building management system (BMS), according to some embodiments.

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, various integrated valve and actuator HVAC devices with wireless communication capabilities are shown, according to some embodiments. The integrated device may combine the functionality of an actuator, a valve, a controller and a wireless communications mechanism into a single package. The wireless communications mechanism permits multiple integrated devices in a system to communicate with each other. An electronic flow rate sensor that measures the flow rate or velocity of fluid flowing through the valve may, alternatively, be integrated within the valve or provided as a separate component The integrated valve and actuator device may be utilized within a cascaded control system. In a cascaded control system, a primary controller generates a control signal that serves as the setpoint for a secondary controller (e.g., the controller within the integrated device). Thus, a cascaded control system contains an outer control loop and an inner control loop. For example, the outer loop (primary) controller may determine a flow rate setpoint for the inner loop based on an optimization module. In response, the inner loop (secondary) controller may utilize flow rate sensor measurements to determine the necessary actuator position setpoint to achieve the flow rate setpoint received from the outer loop. System temperature disturbances may be automatically attenuated by the feedback control action of the inner loop.

A system of wirelessly connected integrated devices may also be utilized to optimize the flow rate of a fluid within a system by ensuring that the flow rate is not greater than the adaptive threshold flow rate. The system automatically determines the adaptive threshold flow rate such that a user or technician is no longer required to set explicit threshold flow and minimum steady-state water temperature difference ($\Delta T$) values. Using the wireless communication capabilities of the integrated device, the connected devices may transmit their actuator/valve positions to a common setpoint controller (which, in some cases, may be one of the integrated devices that has been designated as the setpoint controller) in order to optimize the flow rate setpoint value and operate the integrated devices to achieve this value.

Information about a user's optimization priority setting may be obtained from a user interface such as a thermostat. The optimization module uses this priority setting to decide whether to prioritize comfort or energy efficiency when determining the adaptive threshold flow rate, thus making the threshold flow rate setting adaptive based on a user's preference.

Building Management System and HVAC System

Referring now to FIGS. 1-4, an exemplary building management system (BMS) and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
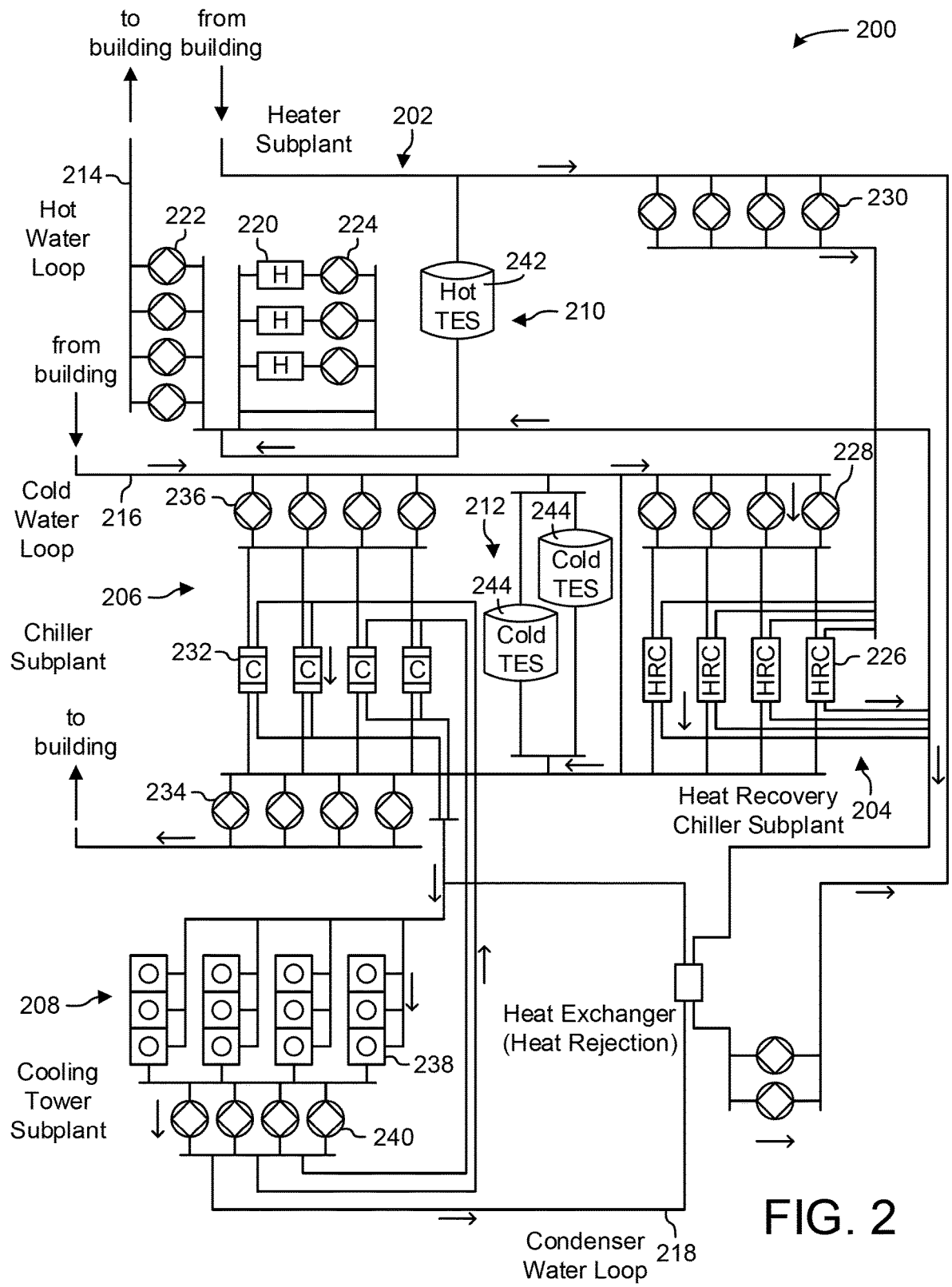
FIG. 2 is a schematic diagram of a waterside system that can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO2$, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
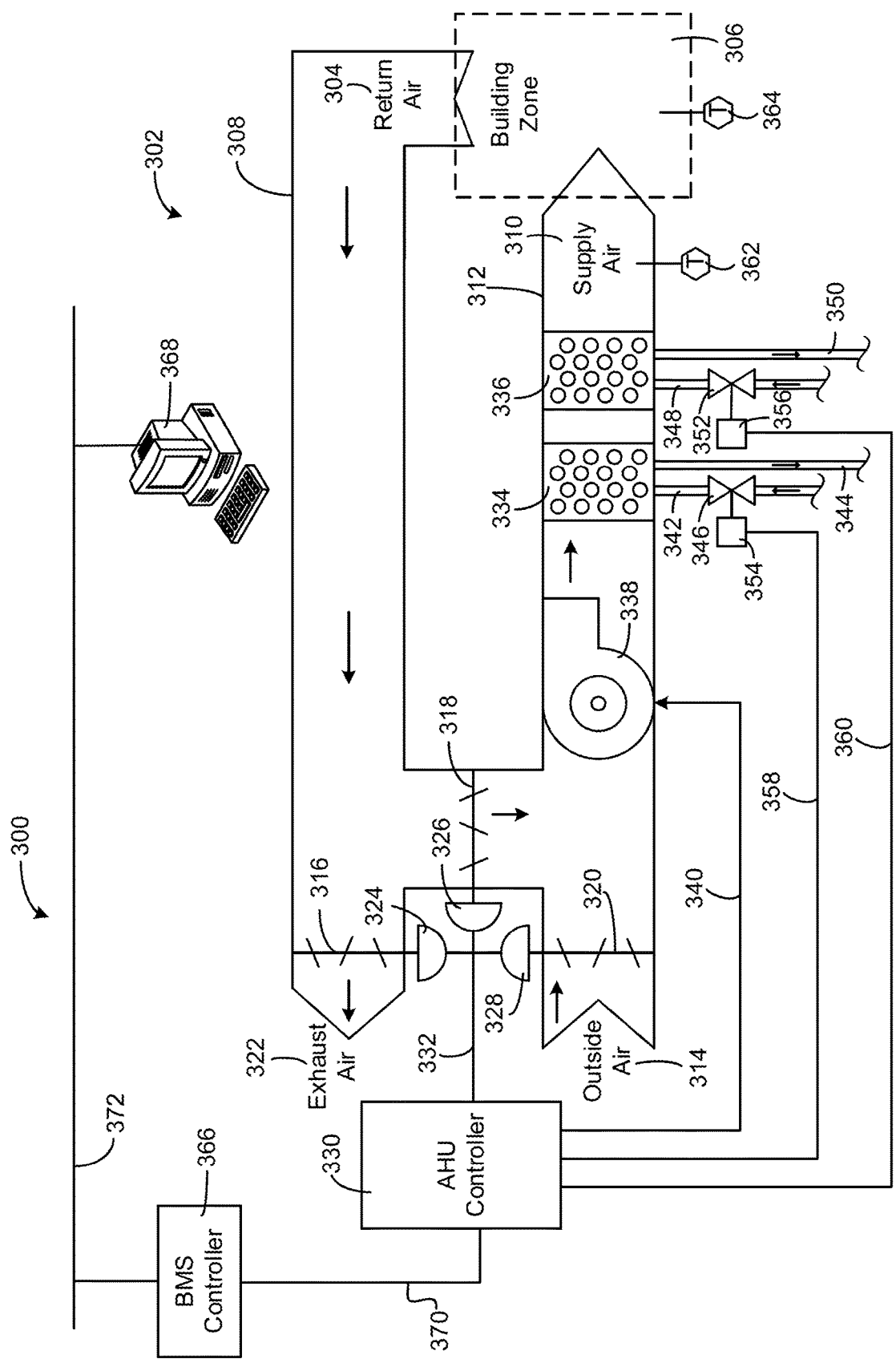
FIG. 3 is a block diagram of an airside system that can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
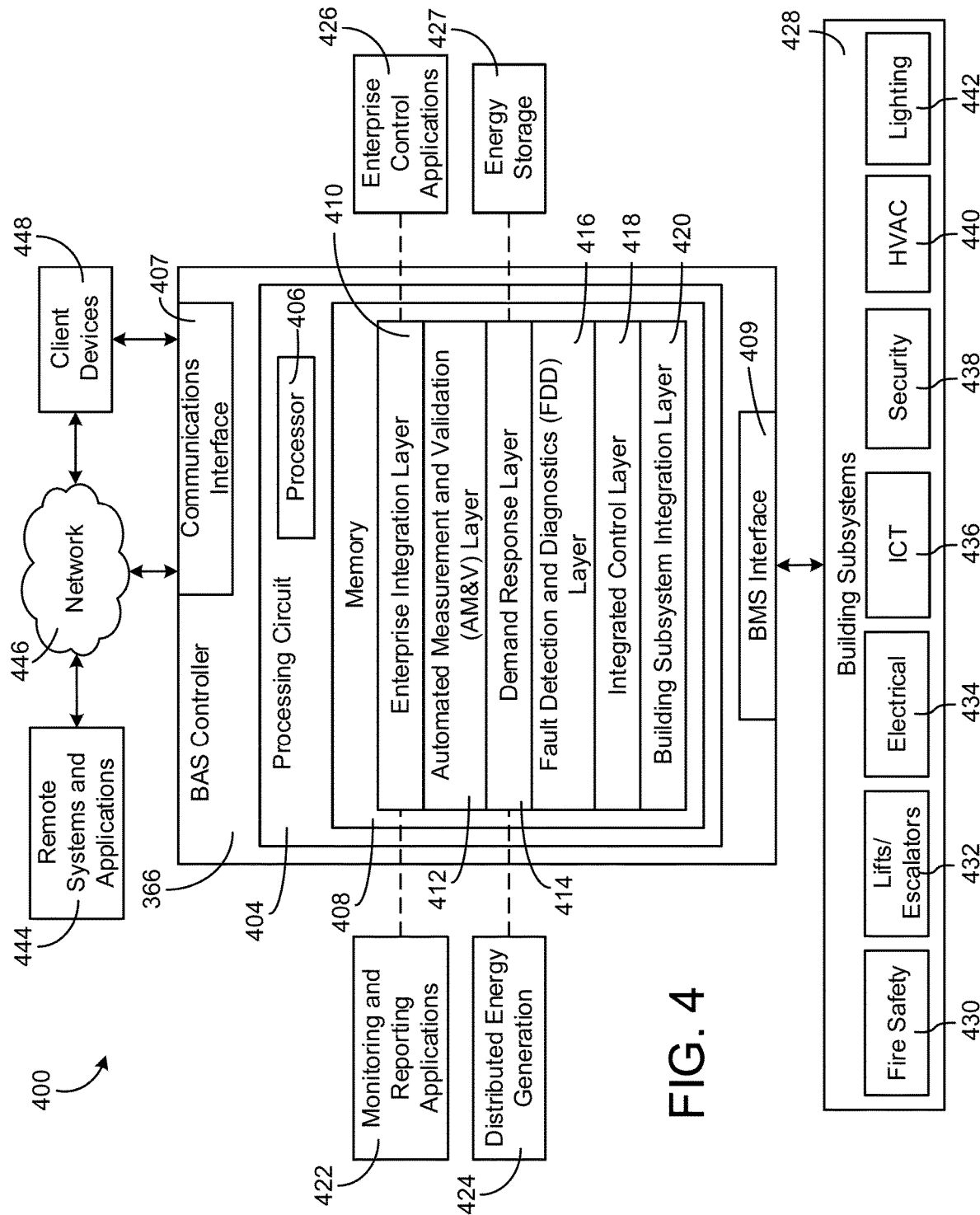
FIG. 4 is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Heat Transfer Versus Flow of Hydronic Coil

Figure 12:
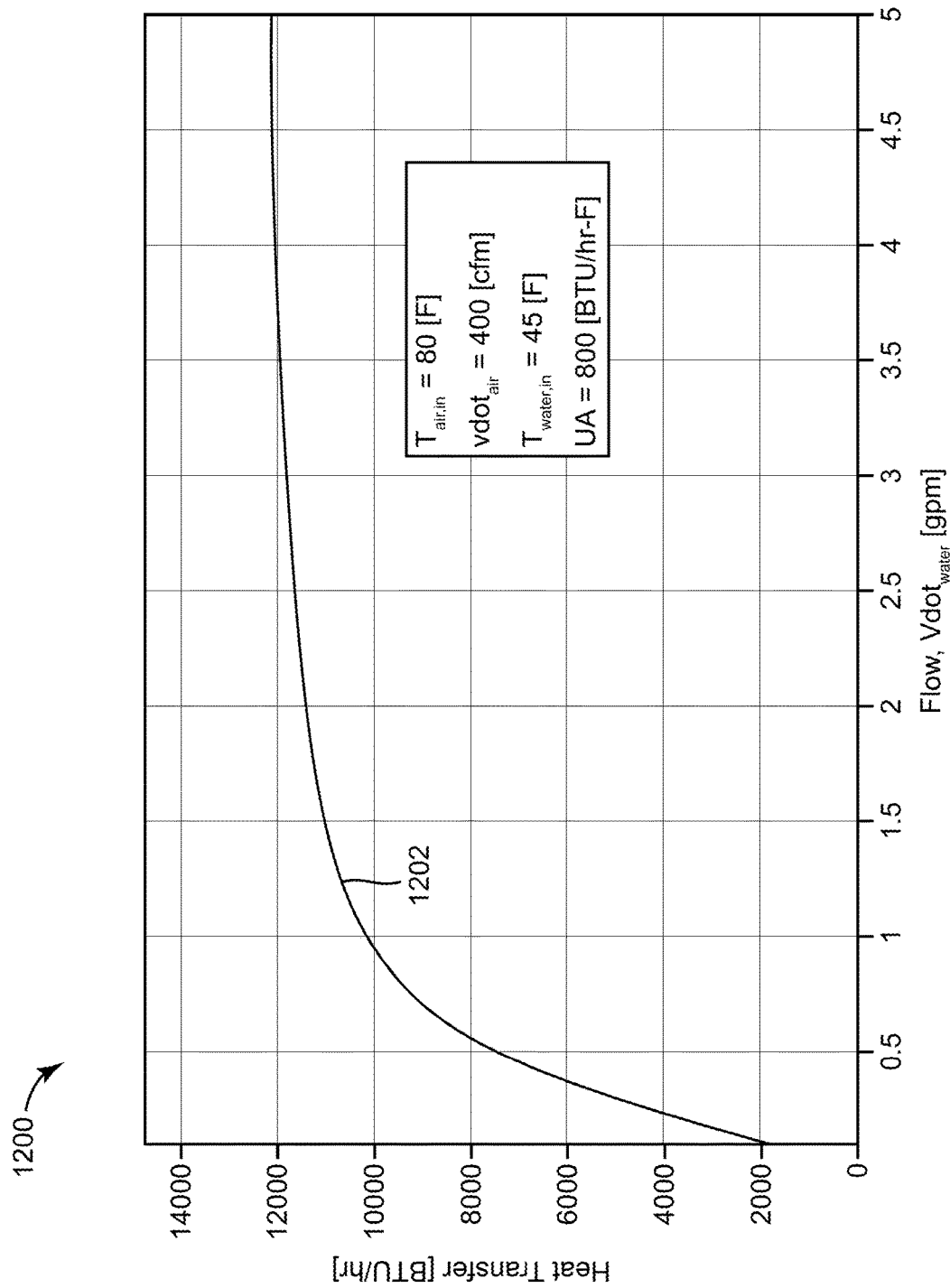
FIG. 12 is a graph of heat transfer of a hydronic coil with respect to flow rate of water through the hydronic coil, according to some embodiments.

Referring particularly to FIG. 12, a graph 1200 of heat transfer (the Y-axis, in BTU/hr) versus flow rate of water (the X-axis, in gallons per minute, "gpm") for a hydronic coil is shown, according to some embodiments. Series 1202 shows the relationship between heat transfer and flow rate of water through the hydronic coil for an air inlet temperature of 80 degrees Fahrenheit, 400 cfm of airflow, 45 degrees Fahrenheit water inlet temperature, and an overall conductance of 800 Btu/hr-F. Series 1202 may represent the trend of a typical hydronic coil. As shown in FIG. 12, the heat transfer (e.g., values on the Y-axis) change greatly at low water flows (e.g., as shown by the steep slope of series 1202 at lower flow rates of the water from approximately 0 to 1 gpm), while changes in the heat transfer are smaller at higher flow rates of the water (e.g., from 1.5 to 5 gpm). Operating at higher water flows may be inefficient, since it requires additional pumping power to push the water through the heat exchanger, yet there is minimal additional heat transfer between the water and the air.

The systems and methods described herein utilize circuit-setting and pressure independent control (PIC) valves to enforce a threshold flow rate setting. In this way, the flow rate of water (or any other fluid used in the heat exchanger) are maintained below the threshold flow rate value. Advantageously, this can improve the efficiency of the HVAC system of the heat exchanger (e.g., a hydronic coil).

Temperature Difference Versus Flow of Hydronic Coil

Figure 13:
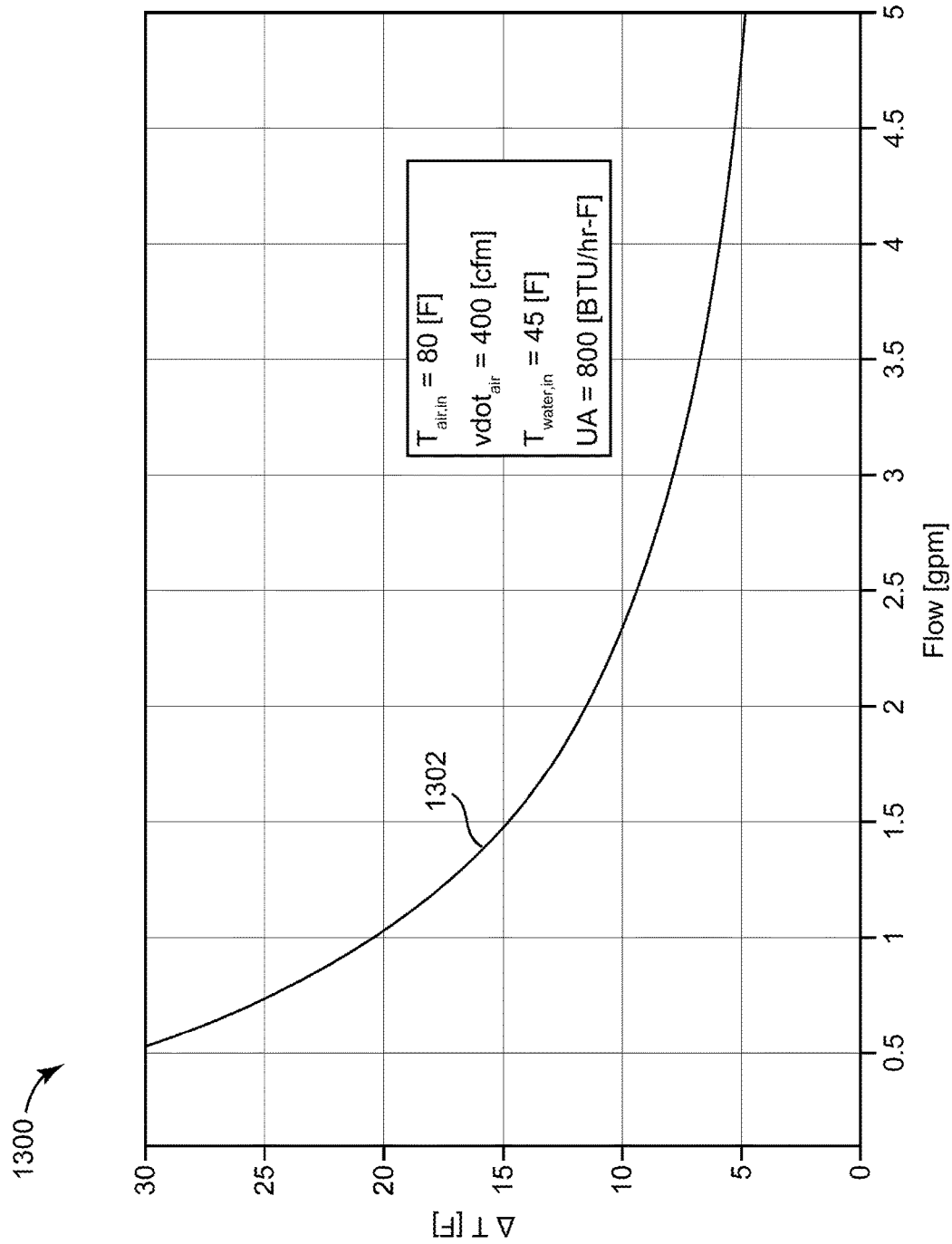
FIG. 13 is a graph of a temperature differential across a hydronic coil with respect to flow rate of water through the hydronic coil, according to some embodiments.

Referring particularly to FIG. 13, a graph 1300 showing a temperature difference ($\Delta T$) (e.g., the Y-axis, a difference between a water inlet temperature and a water outlet temperature) with respect to flow rate of water (e.g., the X-axis, gpm) across a hydronic coil is shown, according to some embodiments. Series 1302 shows the relationship between the temperature differential $\Delta T$ and the flow rate of water for an air inlet temperature of 80 degrees Fahrenheit, a volumetric flow rate of air of 400 cfm, a water inlet temperature of 45 degrees Fahrenheit, and an overall conductance of 800 Btu/hr-F (i.e., with constant values of these properties). As shown in FIG. 13, the temperature differential $\Delta T$ of the water decreases with increased flow rate of the water. This may result since the water spends less time in the heat exchanger (e.g., the hydronic coil) and has less time to exchange heat with the air. Operating chilled water or hydronic cooling coils at lower values of the temperature differential $\Delta T$ may reduce the temperature of water returning to chillers. This may prevent the chillers from providing their rated capacity, which can result in inefficient chiller sequencing strategies. However, the systems and methods described herein may measure instantaneous values of the temperature differential $\Delta T$ and ensure that a valve adjusting the water flow rate maintains the measured temperature differential $\Delta T$ above a minimum setting.

Adaptive Flow Limit Valve Device

Figure 5:
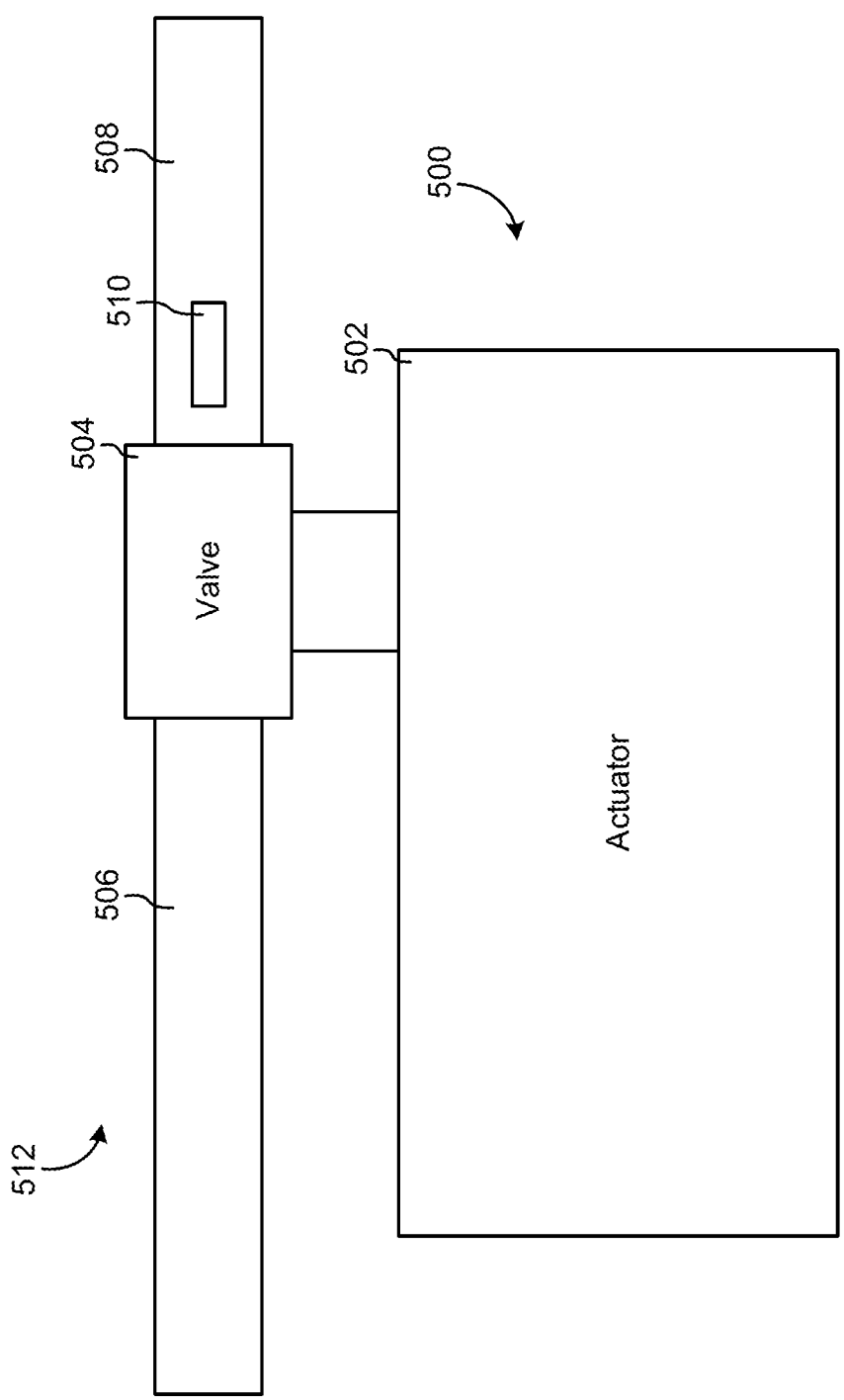
FIG. 5 is a block diagram of an adaptive fluid flow valve assembly that can be implemented in the HVAC system of FIG. 1, according to some embodiments.

Referring now to FIG. 5, a block diagram of an adaptive flow limit valve device 500 is shown, according to some embodiments. Valve assembly 500 may be used in HVAC system 100, waterside system 200, airside system 300, or BMS 400, etc., as described in greater detail above with reference to FIGS. 1-4. Adaptive flow limit valve device 500 is shown to include an actuator 502 operatively coupled with a valve 504. For example, actuator 502 may be a damper actuator, a valve actuator, a fan actuator, a pump actuator, or any other type of actuator that can be used in an HVAC system or BMS. In various embodiments, actuator 502 may be a linear actuator (e.g., a linear proportional actuator), a non-linear actuator, a spring return actuator, or a non-spring return actuator.

Valve 504 may be any type of control device configured to control an environmental parameter in an HVAC system, including a 2-way or 3-way two position electric motorized valve, a ball isolation valve, a floating point control valve, an adjustable flow control device, or a modulating control valve. In some embodiments, valve 504 may regulate the flow of fluid through a conduit, pipe, or tube (e.g., conduit 512) in a waterside system (e.g., waterside system 200, shown in FIG. 2). Conduit 512 may include upstream conduit section 506 and downstream conduit section 508. In other embodiments, valve 504 may regulate the flow of air through a duct in an airside system (e.g., airside system 300, shown in FIG. 3).

In some embodiments, actuator 502 and valve 504 are located within a common integrated device chassis or housing. For example, actuator 502 and valve 504 may be packaged, housed, contained, etc., within a single device as opposed to being packaged as separate devices. Reducing the number of devices in an HVAC system may provide numerous advantages, most notably in time and cost savings during the installation process. Because it is not necessary to install actuator 502 and valve 504 as separate devices and then make a connection between them, technicians performing the installation may require less specialized training and fewer tools. Other advantages of a single device may include simplification of control and troubleshooting functions. However, in some embodiments, actuator 502 and valve 504 are packaged as separate devices that may be communicably coupled via a wired or a wireless connection.

Still referring to FIG. 5, flow sensor 510 is shown disposed within downstream conduit section 508. Flow sensor 510 may be configured to measure the flow rate or velocity of fluid passing through conduit 512, and more specifically, the flow rate of fluid exiting valve 504. Flow sensor 510 may be any type of device (e.g., ultrasonic detector, paddle-wheel sensor, pitot tube, drag-force flowmeter, etc.) configured to measure the flow rate or velocity using any applicable flow sensing method. In some embodiments, flow sensor 510 is a heated thermistor flow sensor that operates according to the principles of King's Law. According to King's Law, the heat transfer from a heated object exposed to a moving fluid is a function of the velocity of the fluid. King's Law devices have several features, including very high sensitivity at low flow rates and measurement of the fluid temperature (which may be useful for fault detection and control purposes), although they have decreased sensitivity at high flow rates.

In other embodiments, flow sensor 510 is a vortex-shedding flowmeter configured to determine the fluid flow rate by calculating the Strouhal number. The Strouhal number is a dimensionless value useful for characterizing oscillating flow dynamics. A vortex-shedding flowmeter measures the flow rate via acoustic detection of vortices in fluid caused when the fluid flows past a cylindrically-shaped obstruction. The vibrating frequency of the vortex shedding is correlated to the flow velocity. Vortex-shedding flowmeters have good sensitivity over a range of flow rates, although they require a minimum flow rate in order to be operational.

In some embodiments, flow sensor 510 is communicably coupled to adaptive flow limit valve device 500. For example, flow sensor 510 may be coupled via wired or wireless connection to a controller of device 500 for the purpose of transmission of flow rate data signals. In various embodiments, flow rate data signals may be used by the controller of device 500 to determine control operations for actuator 502 and/or valve 504. In further embodiments, flow sensor 510 is disposed within valve 504 to measure the rate of fluid flow before the fluid exits valve 504. When flow sensor 510 is located within valve 504, flow sensor 510 may additionally function as a fault detection mechanism for the adaptive flow limit valve device 500. For example, if the flow rate of a fluid surpasses the maximum limit set by optimization module 806 in FIG. 9, which will be further explained below, the flow rate sensor can detect this as a fault condition. As another example, if flow sensor 510 is configured to measure the temperature of the fluid (e.g., because sensor 510 is a heated thermistor flow sensor, described in greater detail with reference to FIG. 6 below) and actuator 502 experiences a failure causing the device to overheat, a controller within device 500 may be able to detect the failure based on temperature data received from flow sensor 510.

Figure 6:
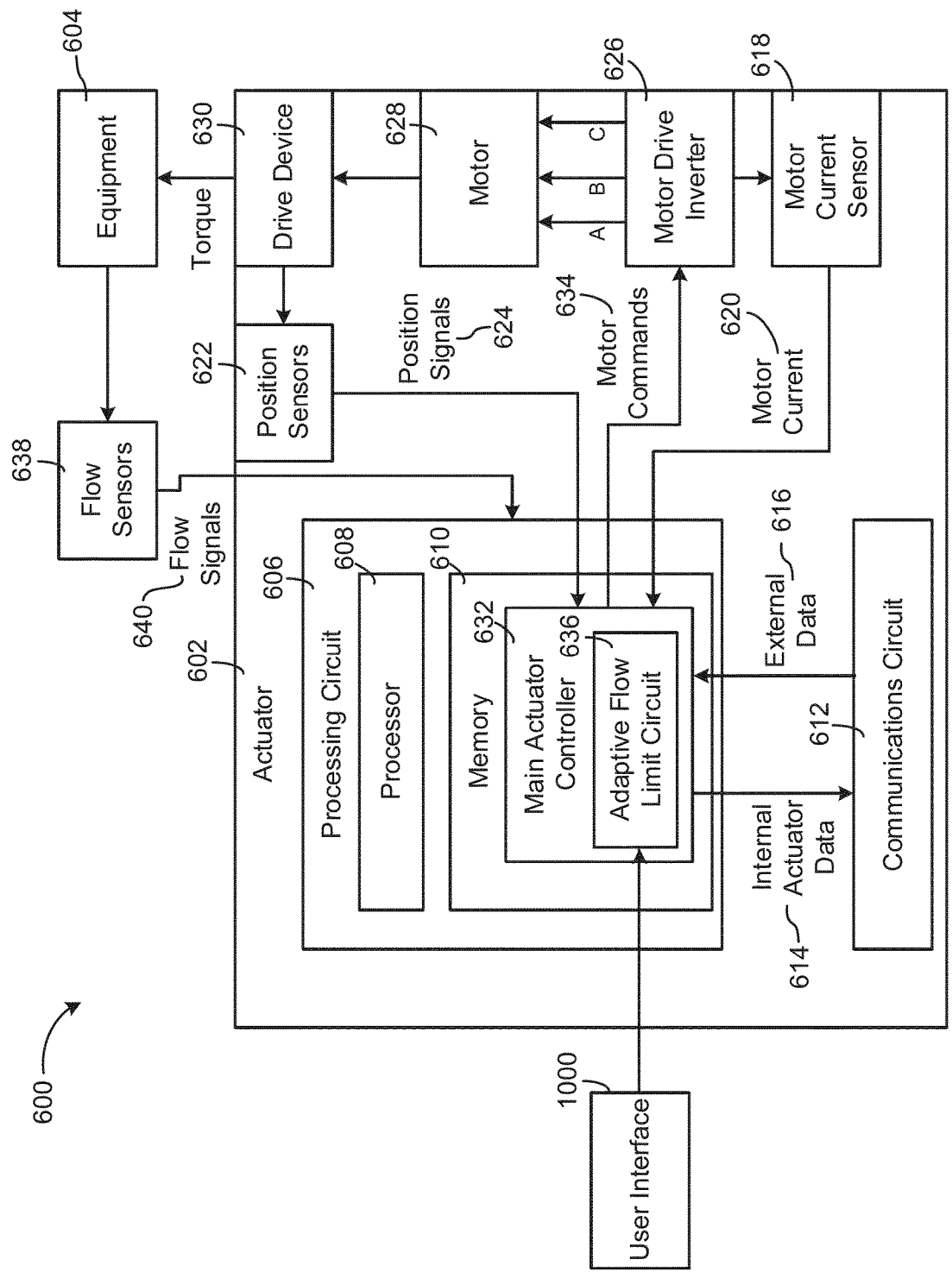
FIG. 6 is a block diagram of another adaptive fluid flow valve assembly that can be implemented in the HVAC system of FIG. 1 including an adaptive flow limit circuit, according to some embodiments.

Referring now to FIG. 6, a block diagram of another adaptive flow limit valve device 600 is shown, according to some embodiments. Valve assembly 600 may be used in HVAC system 100, waterside system 200, airside system 300, or BMS 400, as described with reference to FIGS. 1-4. Valve device 600 may represent a more detailed version of valve assembly 500 or provide additional details of valve assembly 500. For example, valve device 600 is shown to include actuator 602, which may be identical or substantially similar to actuator 502 in valve assembly 500. Actuator 602 may be configured to operate equipment 604. Equipment 604 may include any type of system or device that can be operated by an actuator (e.g., a valve, a damper). In an exemplary embodiment, actuator 602 and equipment 604 (e.g., a valve) are packaged within a common integrated device chassis.

Actuator 602 is shown to include a processing circuit 606 communicably coupled to motor 628. In some embodiments, motor 628 is a brushless DC (BLDC) motor. Processing circuit 606 is shown to include a processor 608, memory 610, and a main actuator controller 632. Processor 608 can be a general purpose or specific purpose processor, an application specific integrated circuit (ASIC), one or more field programmable gate arrays (FPGAs), a group of processing components, or other suitable processing components. Processor 608 can be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 can be communicably connected to processor 608 via processing circuit 606 and may include computer code for executing (e.g., by processor 608) one or more processes described herein. When processor 608 executes instructions stored in memory 610, processor 608 generally configures actuator 602 (and more particularly processing circuit 606) to complete such activities.

Main actuator controller 632 may be configured to receive external system data 616 (e.g., sensor measurements, building zone temperature setpoints, priority setting, etc.), from communications circuit 612, position signals 624 from position sensors 622, and flow signals 640 from flow sensors 638. In addition to external system data, main actuator controller may also access internal control data (e.g. actuator position setpoints, flow rate setpoints) from the adaptive flow limit circuit 636. Main actuator controller 632 may be configured to determine the position of motor 628 and/or drive device 630 based on position signals 624. In some embodiments, main actuator controller 632 receives data from additional sources. For example, motor current sensor 618 may be configured to measure the electric current provided to motor 628. Motor current sensor 618 may generate a feedback signal indicating the motor current 620 and may provide this signal to main actuator controller 632 within processing circuit 608.

Adaptive flow limit circuit 636 may be configured to utilize data received by the main actuator controller 632 in order to determine an adaptive flow limit maximum that may be used to determine set points (e.g. actuator position setpoints, flow rate setpoints). In some embodiments the adaptive flow limit circuit 636 may store various rules and data (e.g. error thresholds) related to the adaptive threshold flow limit. Further details with respect to adaptive flow circuit 636 are included below with reference to FIGS. 8-9.

Still referring to FIG. 6, processing circuit 608 may be configured to output a pulse width modulated (PWM) DC motor command 634 to control the speed of the motor. Motor 628 may be configured to receive a three-phase PWM voltage output (e.g., phase A, phase B, phase C) from drive inverter 626. The duty cycle of the PWM voltage output may define the rotational speed of motor 628 and may be determined by processing circuit 606 (e.g., a microcontroller). Processing circuit 606 may increase the duty cycle of the PWM voltage output to increase the speed of motor 628 and may decrease the duty cycle of the PWM voltage output to decrease the speed of motor 628.

Motor 628 may be coupled to drive device 630. Drive device 630 may be a drive mechanism, a hub, or other device configured to drive or effectuate movement of a HVAC system component (e.g., equipment 604). For example, drive device may be configured to receive a shaft of a damper, a valve, or any other movable HVAC system component in order to drive (e.g., rotate) the shaft. In some embodiments, actuator 602 includes a coupling device configured to aid in coupling drive device 630 to the movable HVAC system component. For example, the coupling device may facilitate attaching drive device 630 to a valve or damper shaft.

Position sensors 622 may include Hall effect sensors, potentiometers, optical sensors, or other types of sensors configured to measure the rotational position of the motor 628 and/or drive device 630. Position sensors 622 may provide position signals 624 to processing circuit 606. Main actuator controller 632 may use position signals 624 to determine whether to operate the motor 628. For example, main actuator controller 632 may compare the current position of drive device 630 with a position setpoint received via adaptive flow limit circuit 636 and may operate the motor 628 to achieve the position setpoint.

Actuator 602 is further shown to include a communications circuit 612. Communications circuit 612 may be a wired or wireless communications link and may use any of a variety of disparate communications protocols (e.g., BACnet, LON, WiFi, Bluetooth, NFC, TCP/IP, etc.). In some embodiments, communications circuit 612 is an integrated circuit, chip, or microcontroller unit (MCU) configured to bridge communications actuator 602 and external systems or devices. In some embodiments, communications circuit 612 is the Johnson Controls BACnet on a Chip (JBOC) product. For example, communications circuit 612 can be a pre-certified BACnet communication module capable of communicating on a building automation and controls network (BACnet) using a master/slave token passing (MSTP) protocol. Communications circuit 612 can be added to any existing product to enable BACnet communication with minimal software and hardware design effort. In other words, communications circuit 612 provides a BACnet interface for the pressure disturbance rejection valve assembly 600. Further details regarding the JBOC product are disclosed in U.S. patent application Ser. No. 15/207,431 filed Jul. 11, 2016, the entire disclosure of which is incorporated by reference herein.

Communications circuit 612 may also be configured to support data communications within actuator 602. In some embodiments, communications circuit 612 may receive internal actuator data 614 from main actuator controller 632. For example, internal actuator data 614 may include the sensed motor current 620, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 604 (e.g., a valve), or any other type of data used or stored internally within actuator 602. In some embodiments, communications circuit 612 may transmit external data 616 to main actuator controller 632. External data 616 and internal data 614 may include, for example, position setpoints, speed setpoints, control signals, configuration parameters, end stop locations, stroke length parameters, commissioning data, equipment model data, actuator firmware, actuator software, or any other type of data which can be used by actuator 602 to operate the motor 628 and/or drive device 630.

In some embodiments, external data 616 is a DC voltage control signal. Actuator 602 can be a linear proportional actuator configured to control the position of drive device 630 according to the value of the DC voltage received. For example, a minimum input voltage (e.g., 0.0 VDC) may correspond to a minimum rotational position of drive device 630 (e.g., 0 degrees, −5 degrees, etc.), whereas a maximum input voltage (e.g., 10.0 VDC) may correspond to a maximum rotational position of drive device 630 (e.g., 90 degrees, 95 degrees, etc.). Input voltages between the minimum and maximum input voltages may cause actuator 602 to move drive device 630 into an intermediate position between the minimum rotational position and the maximum rotational position. In other embodiments, actuator 602 can be a non-linear actuator or may use different input voltage ranges or a different type of input control signal (e.g., AC voltage or current) to control the position and/or rotational speed of drive device 630.

In some embodiments, external data 616 is an AC voltage control signal. Communications circuit 612 may be configured to transmit an AC voltage signal having a standard power line voltage (e.g., 120 VAC or 230 VAC at 50/60 Hz). The frequency of the voltage signal can be modulated (e.g., by main actuator controller 632) to adjust the rotational position and/or speed of drive device 630. In some embodiments, actuator 602 uses the voltage signal to power various components of actuator 602. Actuator 602 may use the AC voltage signal received via communications circuit 612 as a control signal, a source of electric power, or both. In some embodiments, the voltage signal is received from a power supply line that provides actuator 602 with an AC voltage having a constant or substantially constant frequency (e.g., 120 VAC or 230 VAC at 50 Hz or 60 Hz). Communications circuit 612 may include one or more data connections (separate from the power supply line) through which actuator 602 receives control signals from a controller or another actuator (e.g., 0-10 VDC control signals).

Feedback Control System

Figure 7:
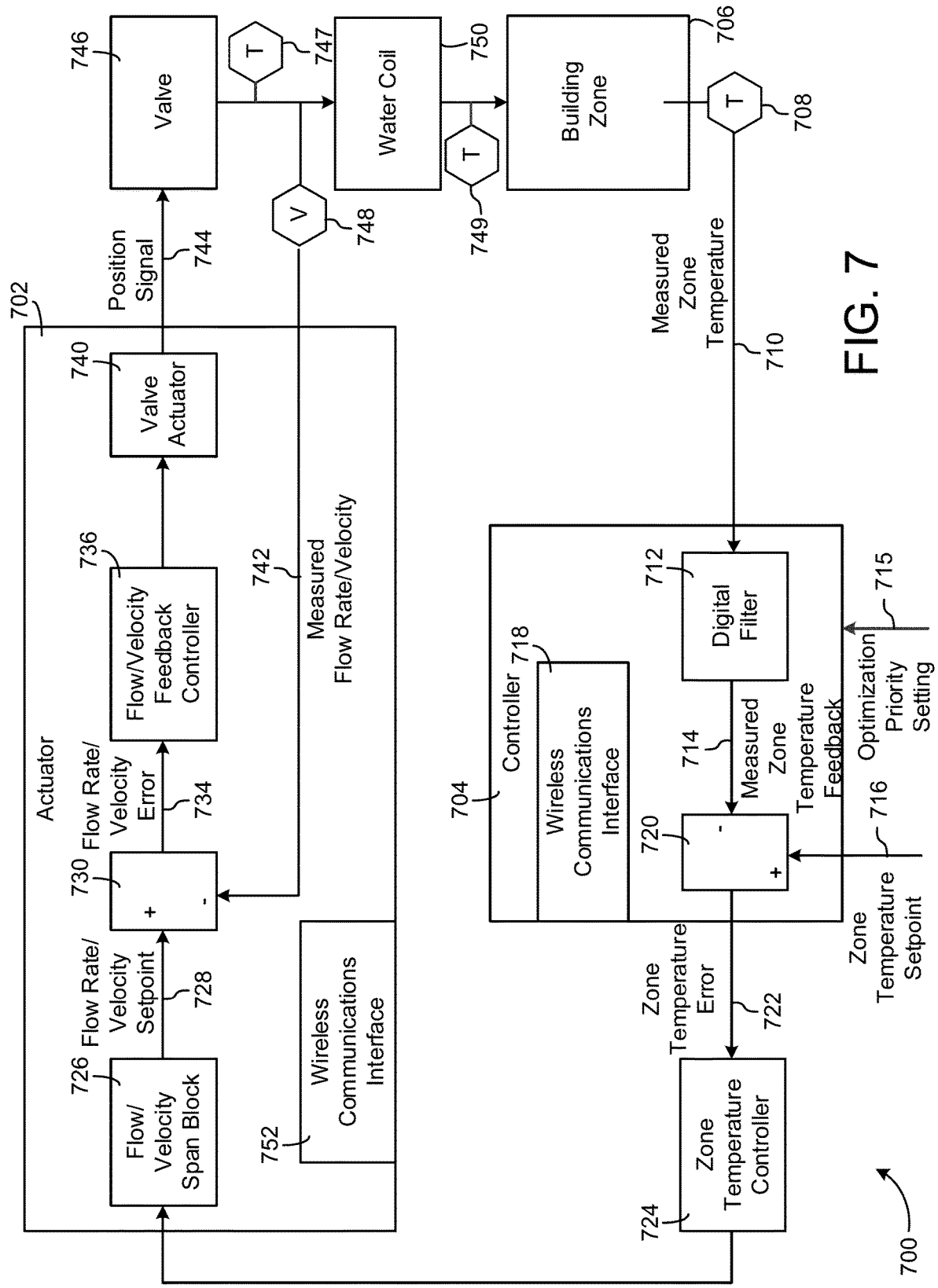
FIG. 7 is a block diagram of an adaptive fluid flow valve assembly within a feedback control system that can be implemented in the HVAC system of FIG. 1, according to some embodiments.

Turning now to FIG. 7, a block diagram of an actuator device 702 within a feedback control system 700 is shown. In some embodiments, the feedback control system 700 is a cascaded feedback control system. In a cascaded control system, a primary controller (e.g., controller 704) generates a control signal that serves as the setpoint for a secondary controller (e.g., flow/velocity feedback controller 736). In some embodiments, the control path including the control signal generated by the primary controller may be referred to as an "outer loop," while the control path including the secondary controller may be referred to as an "inner loop." In some embodiments, cascaded control system 700 is a component or subsystem of HVAC system 100, waterside system 200, airside system 300, or BMS 400, as described with reference to FIGS. 1-4.

Cascaded control system 700 may include, among other components, actuator device 702, controller 704, building zone 706, zone temperature controller 724, and valve 746. In some embodiments, controller 704 is a primary controller for the components of an HVAC system (e.g., HVAC system 100) within the outer control loop of feedback control system 700. In other embodiments, controller 704 is a thermostat or a BMS controller (e.g., for BMS 400). In still further embodiments, controller 704 is a user device configured to run a building management application (e.g., a mobile phone, a tablet, a laptop). Controller 704 may receive data from temperature sensors 708, 747, and 749. Temperature sensor 708 may be any type of sensor or device configured to measure an environmental condition (e.g., temperature) of a building zone 706. Temperature sensor 747 and 749 may be any type of sensor or device configured to measure temperature of a fluid through water coil 750. Building zone 706 may be any subsection of a building (e.g., a room, a block of rooms, a floor).

Controller 704 is further shown to include wireless communications interface 718. In some embodiments, wireless communications interface 718 may communicate data from controller 704 to communications interface 752 of actuator device 702. In other embodiments, communications interfaces 718 and 752 may communicate with other external systems or devices. Communications via interface 718 may be direct (e.g., local wireless communications) or via a communications network (e.g., a WAN, the Internet, a cellular network). For example, interfaces 718 and 752 may include a Wi-Fi transceiver for communicating via wireless communications network. In another example, one or both interfaces 718 and 752 may include cellular or mobile phone communications transceivers. In some embodiments, multiple controllers and smart actuator devices may communicate using a mesh topology. In other embodiments, communications interfaces 718 and 752 may be configured to transmit smart actuator device data (e.g., a fault status, an actuator and/or valve position) to an external network. In still further embodiments, communications interfaces 718 and 752 are connected via a wired, rather than wireless, network.

Comparator 720 may be configured to compare the measured zone temperature feedback signal 714 output from digital filter 712 with a zone temperature setpoint value 716. Comparator 720 may then output a temperature error signal 722 that is received by zone temperature controller 724. Comparator 720 may be a discrete electronics part or implemented as part of controller 704. If comparator 720 determines that the zone temperature feedback signal 714 is higher than the zone temperature setpoint value 716 (i.e., building zone 706 is hotter than the setpoint value), zone temperature controller 724 may output a control signal that causes actuator device 702 to modify the flow rate through water coil 750 such that cooling to building zone 706 is increased. If comparator 720 determines that the zone temperature feedback signal 714 is lower than the zone temperature setpoint value 716 (i.e., building zone 706 is cooler than the setpoint value), zone temperature controller 724 may output a control signal that causes actuator device 702 to modify the flow rate through water coil 750 such that heating to building zone 706 is increased.

In various embodiments, zone temperature controller 724 is a pattern recognition adaptive controller (PRAC), a model recognition adaptive controller (MRAC), or another type of tuning or adaptive feedback controller. Adaptive control is a control method in which a controller may adapt to a controlled system with associated parameters which vary, or are initially uncertain. In some embodiments, zone temperature controller 724 is similar or identical to the adaptive feedback controller described in U.S. Pat. No. 8,825,185, granted on Sep. 2, 2014, the entirety of which is herein incorporated by reference.

Still referring to FIG. 7, actuator device 702 is shown to include a flow/velocity span block 726, a comparator 730, a flow/velocity feedback controller 736, a valve actuator 740, and a communications interface 752. Zone temperature error 722 output from comparator 720 may be transmitted to actuator 702 via zone temperature controller 724. Flow/velocity span block 726 may be configured to enforce allowable maximum and minimum flow range limits on the received zone temperature error 722. Maximum and minimum flow range limits may be determined in optimization module 806 in FIG. 9 which is further explained in the following paragraphs. Optimization module 806 automatically determines the threshold flow rate such that a user or technician is not required to set explicit maximum or minimum flow range limits.

In other embodiments, flow limits may be calibrated on-site (e.g., by a water balancer) at the building location. For example, a water balancer may be used to manually adjust the position of valve 746 until a desired maximum and/or minimum flow rate is obtained, as measured by certified equipment. In some embodiments, these limits are subsequently communicated to flow/velocity span block 726. The water balancing technique may be desirable when a high degree of accuracy in flow rate measurement is desired. In still further embodiments, logic within actuator device 702 (e.g., flow/velocity feedback controller 736) may provide feedback to flow/velocity span block 726 to adjust the flow rate limits based on historical operating data.

Comparator 730 may compare the flow rate/velocity setpoint 728 output received from flow/velocity span block 726 to measured flow rate/velocity data. Measured flow rate velocity data may be received from flow rate sensor 748. Comparator 730 may be a discrete electronics part or implemented as part of flow/velocity feedback controller 736. In some embodiments, comparator 730 may output a flow rate/velocity error signal 734 to flow/velocity feedback controller 736. For example, if comparator 730 determines that flow rate/velocity setpoint 728 is higher than measured flow rate/velocity 742, comparator 730 may generate a flow rate/velocity error signal 734 that causes flow/velocity feedback controller 736 to operate valve actuator 740 to increase the flow rate/velocity through valve 746. Conversely, if comparator 730 determines that flow rate/velocity setpoint 728 is lower than measured flow rate/velocity 742, comparator 730 may generate a flow rate/velocity error signal 734 that causes flow/velocity feedback controller 736 to operate valve actuator 740 to decrease the flow rate/velocity through valve 746.

Flow/velocity feedback controller 736 is configured to receive a flow rate/velocity error signal 734 from comparator 730 and to output a command signal to valve actuator 740 to drive the error signal to zero (i.e., to operate valve actuator 740 such that the measured flow rate/velocity 742 is equal to the flow rate/velocity setpoint 728). Similar to zone temperature controller 724, in various embodiments, flow/velocity feedback controller 736 is a proportional variable deadband controller (PVDC), a pattern recognition adaptive controller (PRAC), a model recognition adaptive controller (MRAC), or another type of tuning or adaptive feedback controller. In other embodiments, flow/velocity feedback controller 736 operates using state machine or proportional-integral-derivative (PID) logic. In some embodiments, flow/velocity feedback controller 736 is identical or substantially similar to the main actuator controller 632 as described with reference to FIG. 6.

Flow/velocity feedback controller 736 may be configured to output an actuator control signal (e.g., a DC signal, an AC signal) to valve actuator 740. In some embodiments, valve actuator 740 is identical or substantially similar to actuators 502 and 602 as described with reference to FIGS. 5 and 6. For example, valve actuator 740 may be a linear actuator (e.g., a linear proportional actuator), a non-linear actuator, a spring return actuator, or a non-spring return actuator. Valve actuator 740 may include a drive device coupled to valve 746 and configured to rotate a shaft of valve 746. In some embodiments, valve 746 is identical or substantially similar to valves 504 and 604 as described with reference to FIGS. 5 and 6. For example, in various embodiments, valve 746 may be a 2-way or 3-way two position electric motorized valve, a ball isolation valve, a floating point control valve, an adjustable flow control device, or a modulating control valve.

Still referring to FIG. 7, cascaded flow rate system is further shown to include a flow rate sensor 748. In some embodiments, flow rate sensor 748 is identical or substantially similar to the flow rate sensors 510 and 638 as described with reference to FIGS. 5 and 6. For example, in various embodiments, flow rate sensor 748 may be a heated thermistor flow sensor or a vortex-shedding flowmeter. Flow rate sensor 748 may be disposed downstream of valve 746 to measure the flow rate and/or velocity of fluid exiting valve 746. In some embodiments, flow rate sensor 748 is configured to have high sensitivity to changes in flow rate or velocity. In further embodiments, cascaded control systems may be configured to reject fluctuations in system characteristics. For example, these characteristics may include inlet water temperature, inlet air temperature, and airside mass flow. Once collected, measured flow rate and/or velocity data 742 from flow rate sensor 748 may be provided to comparator 730 of actuator device 702.

Fluid that passes through valve 746 may flow through water coil 750. Temperature sensors 747 and 749 measure steady state temperature difference of fluid in coil 750. In some embodiments, valve 746 is used to modulate an amount of heating or cooling provided to the supply air for building zone 706. In various embodiments, water coil 750 may be used to achieve zone setpoint temperature 716 for the supply air of building zone 706 or to maintain the temperature of supply air for building zone 706 within a setpoint temperature range. The position of valve 746 may affect the amount of heating or cooling provided to supply air via water coil 750 and may correlate with the amount of energy consumed to achieve a desired supply air temperature.

Adaptive Flow Limit Optimization

FIGS. 8-11 demonstrate in more detail adaptive flow limit circuit 636. Adaptive flow limit circuit 636 utilizes an adaptive ΔT vs fluid flow model of a heat exchanger in order to determine an adaptive threshold flow rate (e.g., a maximum allowable flow rate, a maximum flow rate setting, a max flow rate, etc.) based on user settings. This model is used to enforce a minimum fluid ΔT value for the heat exchanger forcing the heat exchanger to always operate at or above the minimum ΔT setting. The model is shown below:

$$\overline{\Delta T} = \frac{1}{1 + b\overline{m}}$$

according to some embodiments. In some embodiments, the variables or parameters of the model are defined in Table 1, shown below:

TABLE 1

ΔT vs Flow model variable definitions.

| Variable | Name | Description |
| --- | --- | --- |
| $\overline{\Delta T}$ | Delta T | Non-dimensional temperature difference of the water or fluid across the coil. |
| b | Coefficient | The coefficient that affects the convexity of the model. |
| $\overline{m}$ | Flow rate | Non-dimensional flow rate of the water through the coil. |

The coefficient b can be determined using recursive least squares or any other adaptive filter or adaptive regression (e.g., a linear or non-linear filter or regression model with a transfer function that is controlled, adjusted, updated, etc., using one or more adjustable parameters or variables), which updates the coefficient based upon the latest water temperature and flow measurements. In some embodiments, the coefficient b is an adaptive model parameter. This model provides a relationship between the coil's flow and ΔT. In some embodiments, the model is adaptive, adjustable, automatically updated, etc., by the adaptive flow limit circuitry 636. A slope model can be used to determine a threshold flow value max that provides a reasonable tradeoff between energy-use and comfort. In some embodiments, the slope model is obtained by taking a derivative of the model shown above with respect to the flow rate $\overline{m}$. The slope model is shown below:

$$\frac{d\overline{\Delta T}}{d\overline{m}} = \frac{-b}{(1 + b\overline{m})^2}$$

according to some embodiments. The slope model may define a gradient or slope of the temperature differential $\overline{\Delta T}$ with respect to the flow rate $\overline{m}$. In some embodiments, the slope model defines the gradient as a function of both the flow rate $\overline{m}$ and the coefficient b such that a threshold gradient value ($s_{thresh}$ as described in greater detail below) corresponds to a first threshold flow rate when the coefficient b has a first value. In some embodiments, the threshold gradient $s_{thresh}$ (described below) corresponds to a second threshold flow rate of fluid, different from the first threshold flow rate, when the slope model has a second value different from the first value.

Figure 14:
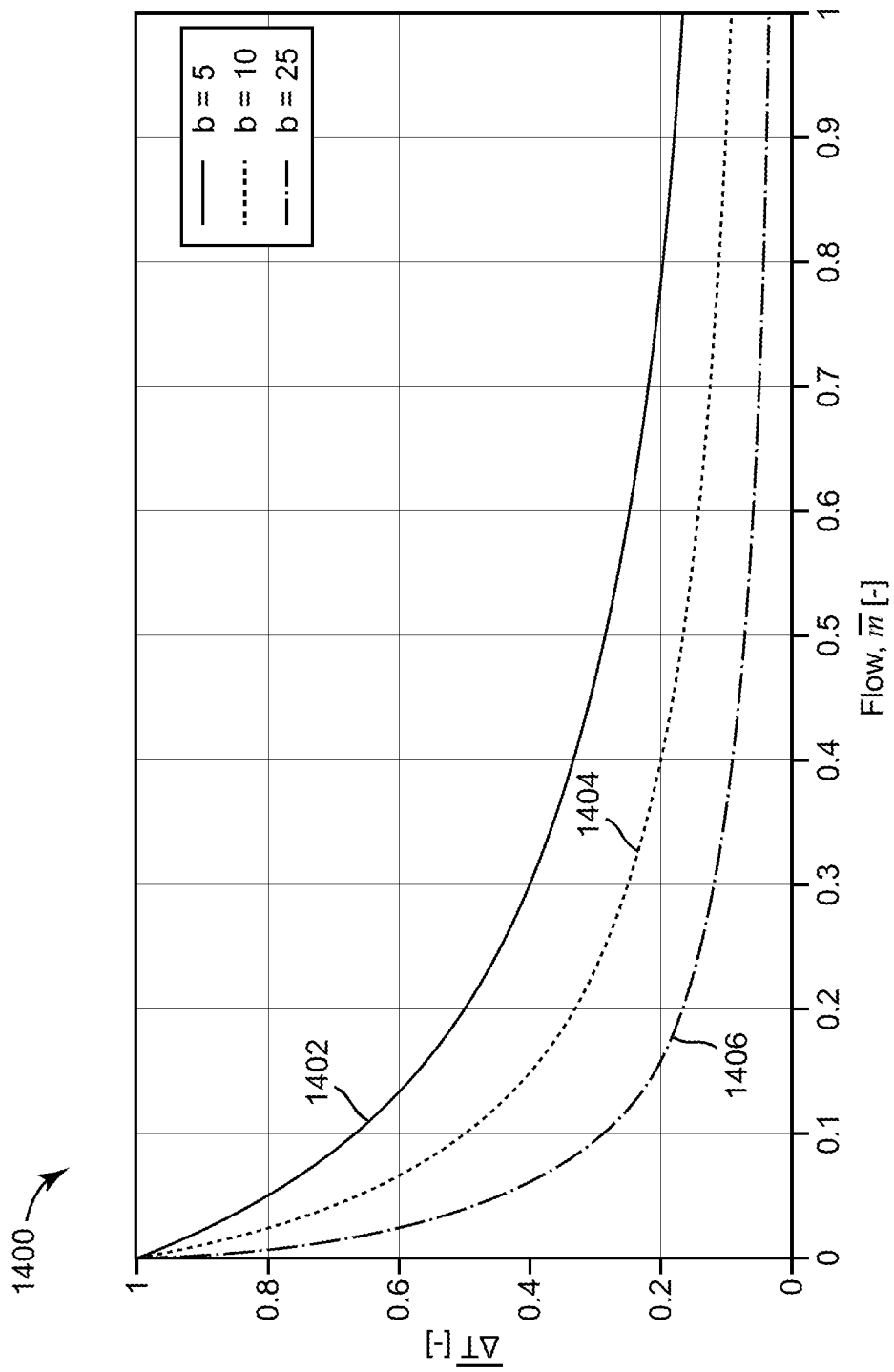
FIG. 14 is a graph of a dimensionless temperature differential across a coil with respect to dimensionless flow rate of water or coolant through the coil, according to some embodiments.

Referring particularly to FIG. 14, a graph 1400 shows the temperature differential $\overline{\Delta T}$ (e.g., a non-dimensional temperature differential) with respect to the flow rate $\overline{m}$ (e.g., a non-dimensional flow rate of water through the coil) for various values of the coefficient b as represented by series 1402-1406. Series 1402 shows the temperature differential $\overline{\Delta T}$ with respect to the flow rate $\overline{m}$ for a value of the coefficient b=5 (e.g., the model when b=5). Series 1404 shows the temperature differential $\overline{\Delta T}$ with respect to the flow rate $\overline{m}$ for a value of the coefficient b=10 (e.g., the model when b=10). Series 1406 shows the temperature differential $\overline{\Delta T}$ with respect to the flow rate $\overline{m}$ for a value of the coefficient b=25 (e.g., the model when b=25). As shown in FIG. 14, increased values of the coefficient b may result in lower values of the temperature differential T for a value of the flow rate $\overline{m}$. In this way, increasing or adjusting the value of the coefficient b may increase or adjust a convexity of the model (as shown in FIG. 14, with increased convexity from series 1402 to series 1406 with increased values of the coefficient b).

Referring again to FIGS. 8-11, in one exemplary embodiment, a threshold slope value could be set a-priori and used in conjunction with the model above to determine an adaptive threshold flow limit. In another exemplary embodiment a user-configurable setting can be translated to a corresponding slope threshold value which can be used in conjunction with the model above to determine an adaptive threshold flow limit. In another exemplary embodiment the adaptive threshold flow rate can be determined through optimization module 806.

Referring particularly to FIG. 6, adaptive flow limit circuit 636 may be configured to define, determine, calculate, estimate, obtain, etc., a value of a threshold slope, $s_{thresh}$. In some embodiments, the threshold slope $s_{thresh}$ is set a-priori and used in conjunction with the slope model. For example, the threshold slope $s_{thresh}$ can be a predetermined or predefined value that is set by a user or is preset in adaptive flow limit circuit 636. In some embodiments, adaptive flow limit circuit 636 uses a threshold equation, shown below:

$$s_{thresh} = \frac{-b}{(1 + b\overline{m}_{max})^2}$$

where b is the coefficient (as described in greater detail above), $\overline{m}_{max}$ is a non-dimensional threshold flow setting (e.g., a threshold flow rate, a threshold flow parameter, etc.), and $s_{thresh}$ is the threshold slope. In some embodiments, the threshold equation shown above is used to calculate the value of the threshold flow setting or the threshold flow rate $\overline{m}_{max}$ corresponding to the threshold slope $s_{thresh}$. In some embodiments, the values of the coefficient b and the threshold flow setting $\overline{m}_{max}$ are always positive values so that the threshold slope $s_{thresh}$ is always a negative value. Re-arranging the threshold equation yields an equation that adaptive flow limit circuit 636 may use to obtain, determine, calculate, estimate, etc., the threshold flow setting $\overline{m}_{max}$, shown as a threshold flow equation below:

$$\overline{m}_{max} = \frac{-1 + \sqrt{-\frac{b}{s_{thresh}}}}{b}$$

according to some embodiments. In some embodiments, the coefficient b used in the threshold flow equation (e.g., a model) is adaptive with respect to time, and accordingly, the threshold flow setting $\overline{m}_{max}$ is also adaptive with respect to time.

In some embodiments, adaptive flow limit circuit 636 is configured to detect or identify if the flow rate is greater than the threshold flow setting (e.g., a threshold flow rate). If the flow rate is greater than the threshold flow setting, adaptive flow limit circuit 636 may control valve actuator 740 to drive the flow rate below the threshold flow setting (e.g., by closing or shutting the valve).

Figure 15:
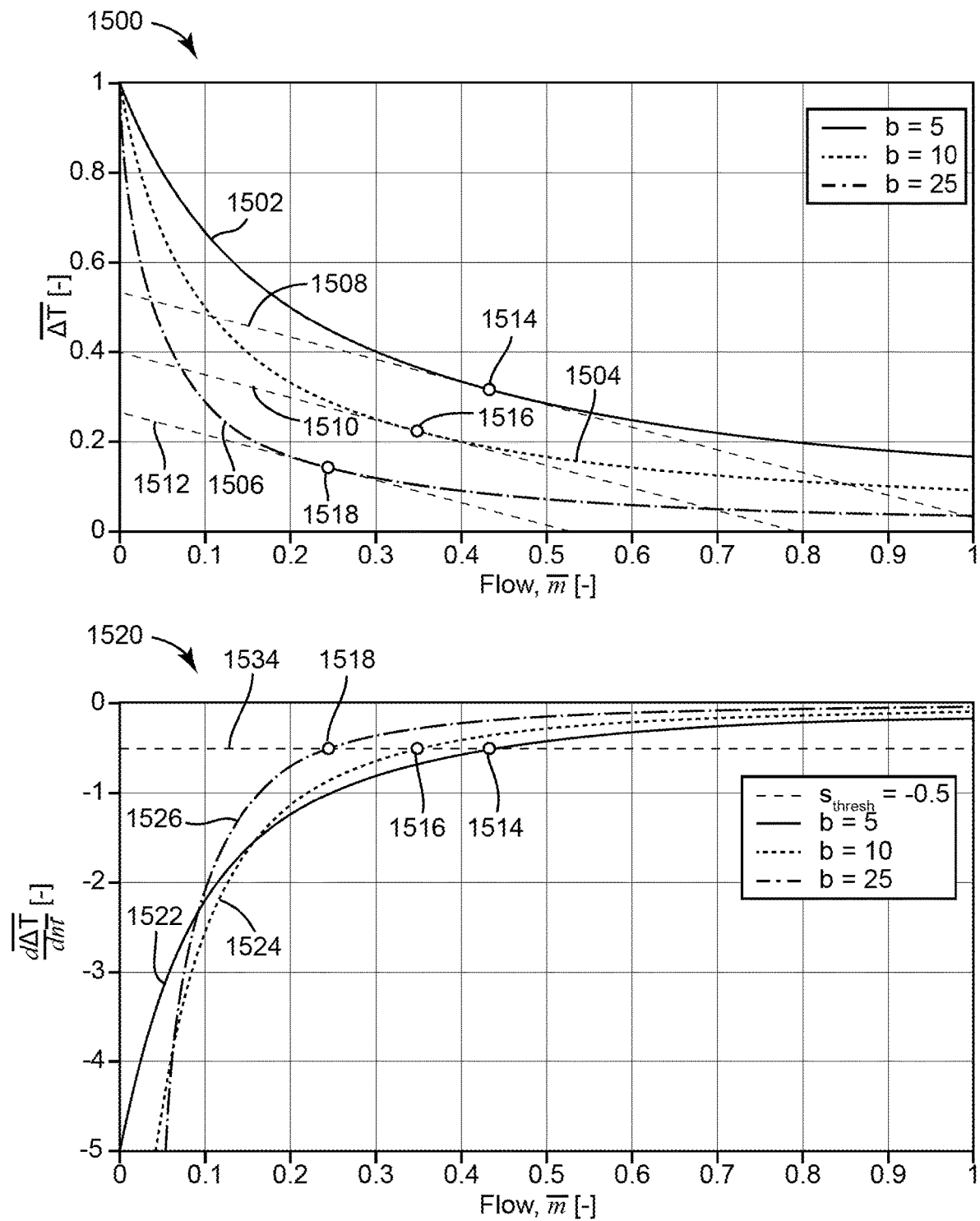
FIG. 15 is a graph of a dimensionless temperature differential with respect to dimensionless flow rate for a coil, and a slope of the temperature differential with respect to the dimensionless flow rate for the coil, according to some embodiments.

Referring particularly to FIGS. 6 and 15, graphs 1500 and 1520 show how adaptive flow limit circuit 636 may use the value of the threshold slope $s_{thresh}$ to determine the threshold flow setting $\overline{m}_{max}$, according to some embodiments. Graph 1500 shows the temperature differential $\overline{\Delta T}$ with respect to the flow rate $\overline{m}$. Graph 1520 shows the slope $$\frac{d\overline{\Delta T}}{d\overline{m}}$$

with respect to the flow rate $\overline{m}$. Graph 1500 includes series 1502-1506 showing the relationship between the temperature differential $\overline{\Delta T}$ and the flow rate $\overline{m}$ for values of b=5, b=10, and b=25. Likewise, graph 1520 includes series 1522-1526 showing the relationship between the sloped $$\frac{d\overline{\Delta T}}{d\overline{m}}$$

with respect to the flow rate $\overline{m}$ for values of b=5, b=10, and b=25. Graph 1520 also includes the threshold slope $s_{thresh}$, represented by threshold 1534. Threshold 1534 intersects with series 1522 at intersection point 1528, series 1524 at intersection point 1530, and series 1526 at intersection point 1532. In some embodiments, adaptive flow limit circuit 636 is configured to determine a corresponding value of the flow rate $\overline{m}$ at each intersection point 1528-1532. For example, adaptive flow limit circuit 636 may determine the flow rate $\overline{m}$ associated with the intersection point (e.g., depending on the value of the coefficient b) using the threshold flow equation shown above. In some embodiments, the threshold flow equation is used by adaptive flow limit circuit 636 to determine the value of the flow rate $\overline{m}$ associated with the intersection point (e.g., the threshold flow setting $\overline{m}_{max}$).

Dashed lines 1508-1512 each have a slope $m = s_{thresh}$ and correspond to a different model curve at the corresponding model curve's $\dot{V}_{max}$. For example, dashed line 1508 has a slope $m = s_{thresh}$ and passes through series 1502 (e.g., b=5) at point 1514 which represents the threshold flow rate $\overline{m}_{max}$ for b=5. Likewise, dashed line 1510 has a slope $m = s_{thresh}$ and passes through series 1504 (e.g., b=10) at point 1516 which represents the threshold flow rate $\overline{m}_{max}$ for b=10. Finally, dashed line 1512 has a slope $m = s_{thresh}$ and passes through series 1506 at point 1518 which represents the threshold flow rate $\overline{m}_{max}$ for b=25. As shown in graph 1520, each of points 1514-1518 have a slope $$\frac{d\overline{\Delta T}}{d\overline{m}}$$

that is substantially equal to $s_{thresh}$ ($s_{thresh}=-0.5$). In graph 1520, dashed lines 1508-1512 are all represented by dashed line 1534. Dashed lines 1508-1512 visualize that as the model updates/adapts, the $\dot{V}_{max}$ or $\bar{m}_{max}$ value also adapts.

In some embodiments, adaptive flow limit circuit 636 is configured to use the threshold flow equation, shown above, to determine the threshold flow setting $\bar{m}_{max}$. Adaptive flow limit circuit 636 may determine the threshold flow setting $\bar{m}_{max}$ and convert the threshold flow setting from a unitless value $\bar{m}_{max}$ to a dimensional value, $\dot{V}_{max}$.

In some embodiments, the threshold flow setting $\bar{m}_{max}$ and the unitless temperature differential $\overline{\Delta T}$ are transformed between their unitless or dimensionless values and their corresponding dimensional values by adaptive flow limit circuit 636. For example, adaptive flow limit circuit 636 may transform the threshold flow setting $\dot{V}_{max}$ or the flow rate V by normalizing the threshold flow setting $\dot{V}_{max}$ or the flow rate V relative to a reference value $\dot{V}_{max,ref}$ or $\dot{V}_{ref}$ that corresponds to the valve assembly's configurations or settings (e.g., valve assembly 500, valve assembly 600, valve 746, etc.). In some embodiments, the unitless or dimensionless temperature differential $\overline{\Delta T}$ is obtained by normalizing a dimensional temperature differential $\Delta T$ relative to a reference temperature differential value $\Delta T_{ref}$ that corresponds to the coil's design parameters. In some embodiments, the temperature differential $\overline{\Delta T}$, flow rate $\dot{V}$, or threshold flow setting $\dot{V}_{max}$ are transformed to dimensionless or unitless values by adaptive flow limit circuit 636 since it allows for the functionality of adaptive flow limit circuit 636 to be used for any system regardless of size and/or settings. For example, a small coil with a design flow rate $\dot{V}$ of 5 gpm may be solved using the same approach as a larger coil with a design flow rate $\dot{V}$ of 500 gpm. Advantageously, using dimensionless or unitless values facilitates robustness and applicability of the functionality of adaptive flow limit circuit 636 for various sized valves.

Referring again to FIG. 6, the threshold slope $s_{thresh}$ may be set a-priori (e.g., hard-coded into adaptive flow limit circuit 636, a predetermined value, a preset value, a predefined value, etc.), or may be obtained, calculated, determined, estimated, etc., by adaptive flow limit circuit 636 using a transformation function, shown below:

$$s_{thresh}=s_{EP}+w(s_{CP}-s_{EP})$$

according to some embodiments. In some embodiments, the transformation function shown above is used by adaptive flow limit circuit 636 to translate a user-configurable setting to a value of the slope threshold $s_{thresh}$. Advantageously, this may provide the user with additional flexibility, allowing the user to control a threshold or maximum flow setting without requiring extensive knowledge of the application. In some embodiments, the transformation function is a linear span. The variables of the transformation function shown above are defined in Table 2 below:

TABLE 2

Slope Threshold Transformation Variable Definitions

| Symbol | Name | Description |
| --- | --- | --- |
| $s_{thresh}$ | Threshold slope | The value of the slope that is used to determine the adaptive threshold flow setting. |
| $s_{EP}$ | Energy priority slope | The threshold slope where energy use is prioritized or minimized at the tradeoff of less comfort. |

TABLE 2-continued

Slope Threshold Transformation Variable Definitions

| Symbol | Name | Description |
| --- | --- | --- |
| $s_{CP}$ | Comfort priority slope | The threshold slope where comfort is prioritized or maximized at the tradeoff of using more energy. |
| $w_{comfort}$ | Comfort weight | User-adjustable weighting value that can vary from 0-1, specifying the user's relative priority for comfort. When at 1, the slope threshold will take its comfort priority slope. When at 0, the slope threshold will take its energy priority slope. |

In some embodiments, the energy priority slope $s_{EP}$ and the comfort priority slope $s_{CP}$ are predetermined, predefined, or preset values that are stored in adaptive flow limit circuit 636. The comfort weight $w_{comfort}$ may be a user adjustable value that can vary from 0 to 1. The comfort weight $w_{comfort}$ can be received by adaptive flow limit circuit 636 through a user interface and may specify a user's particular preference for comfort versus cost savings. In some embodiments, the energy priority slope $s_{EP}$ is a gradient value that prioritizes energy consumption and corresponds to a first temperature difference $\Delta T_1$ of the fluid across the heat exchanger. In some embodiments, the comfort priority slope $s_{CP}$ is a gradient value that prioritizes occupant comfort and corresponds to a second temperature difference $\Delta T_2$ of the fluid across the heat exchanger. In some embodiments, the second temperature difference $\Delta T_2$ is less than the first temperature difference $\Delta T_1$.

Figure 16:
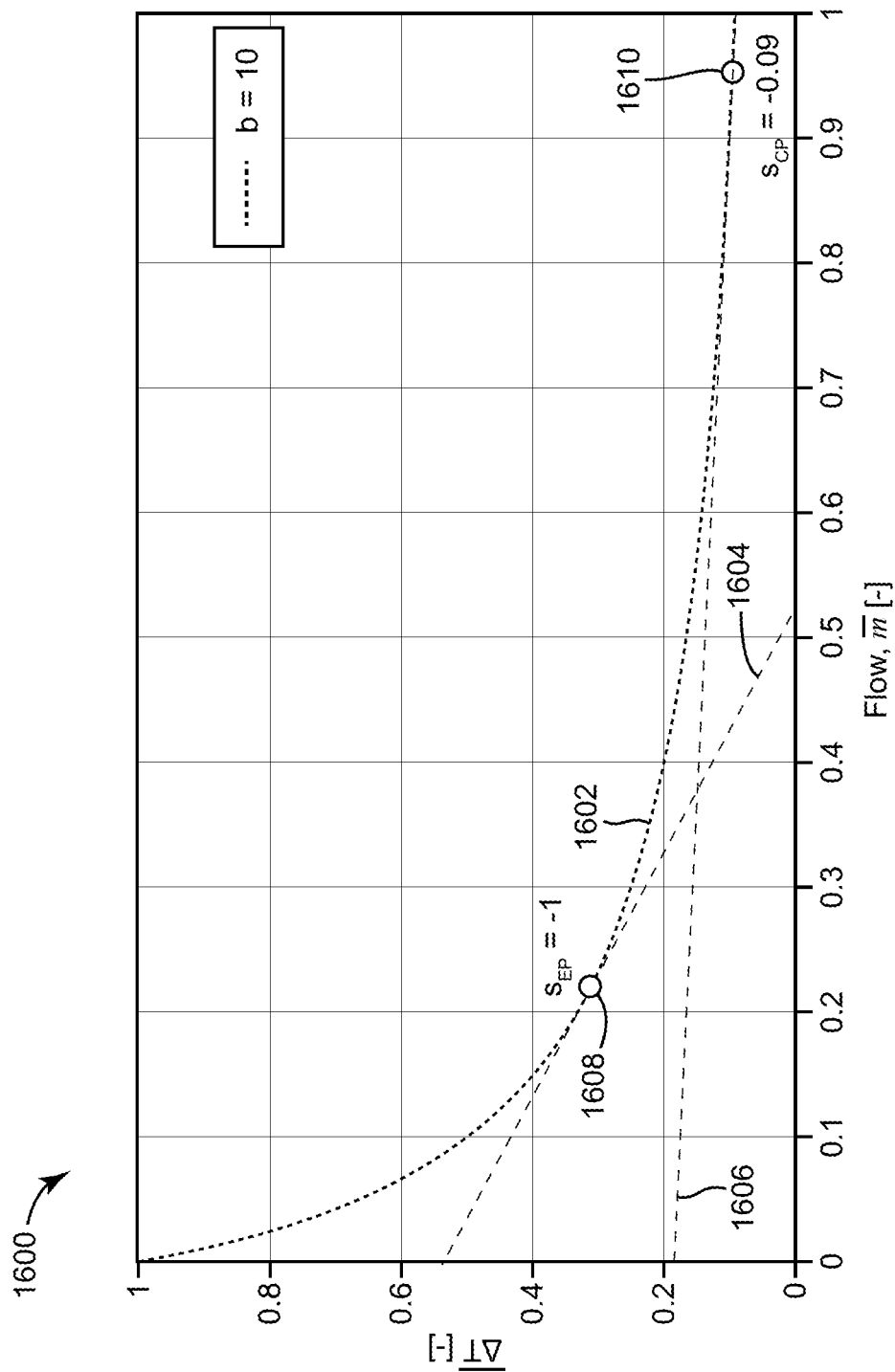
FIG. 16 is a graph of a dimensionless temperature differential across a coil, with respect to flow rate through the coil, according to some embodiments.

Referring particularly to FIGS. 6 and 16, graph 1600 includes a series 1602 representing a plot of the temperature differential $\overline{\Delta T}$ versus flow m model for a value of the coefficient b=10, according to some embodiments. Graph 1600 shows points on series 1602 that would be feasible if the user has the ability to adjust or choose a value of the comfort weight $w_{comfort}$. For example, a first slope threshold line 1604 has a first slope and intersects series 1602 at intersection point 1608. At intersection point 1608, the value of the energy priority slope $s_{EP}$ is substantially equal to −1. A second slope threshold line 1606 has a second slope and intersects series 1602 at intersection point 1610. At intersection point 1610, the value of the comfort priority slope $s_{CP}$ is substantially equal to −0.09. In some embodiments, any values of the flow rate $\bar{m}$ of series 1602 between intersection point 1608 and intersection point 1610 may be achieved or selected by the user by adjusting, choosing, increasing, decreasing, etc., the comfort weight $w_{comfort}$. Adaptive flow limit circuit 636 can calculate, determine, etc., the threshold slope $s_{thresh}$ using the transformation function shown above and use the value of the threshold slope $s_{thresh}$ to determine the threshold flow setting $\bar{m}_{max}$ using the threshold flow equation, shown above.

Figure 8:
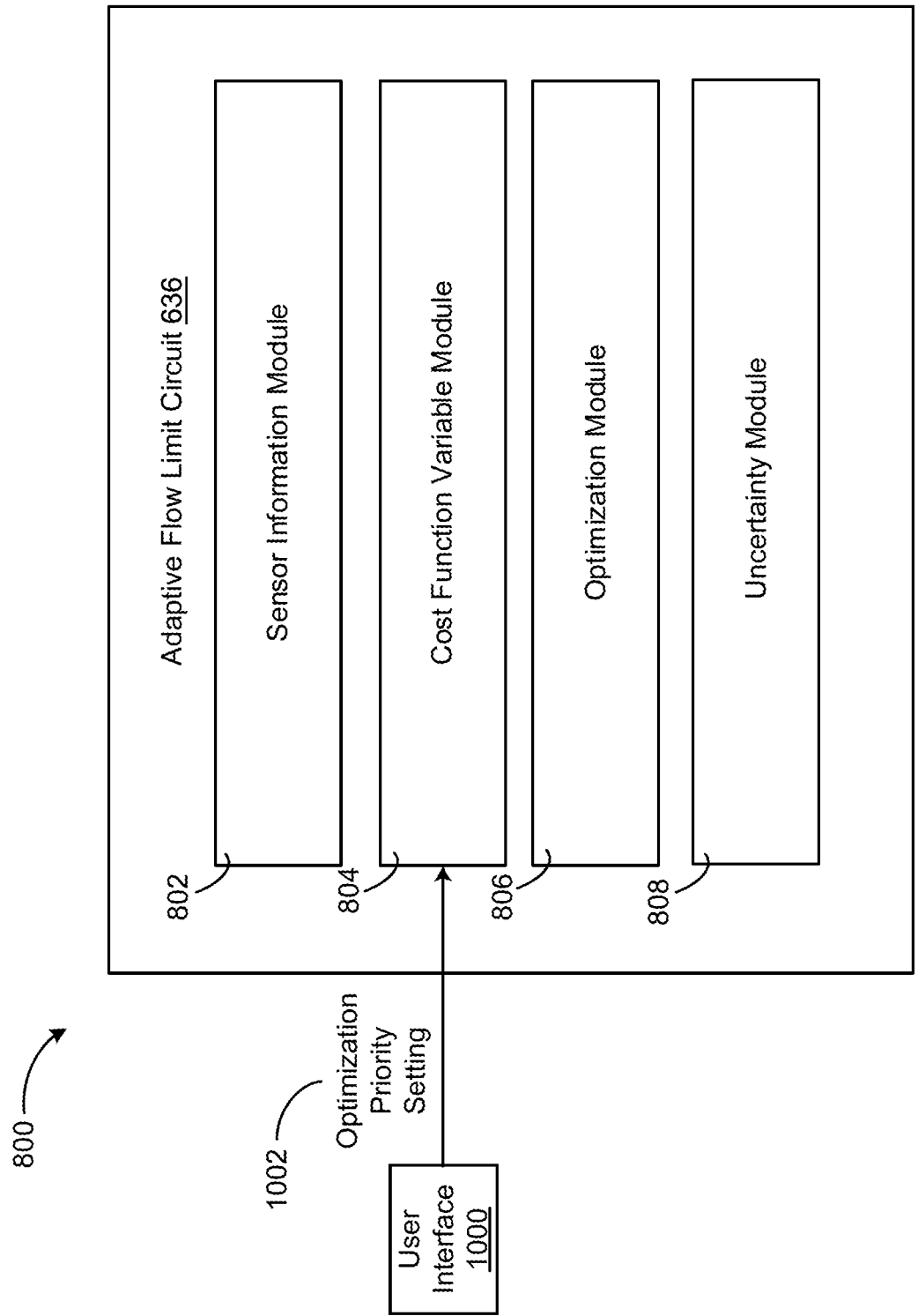
FIG. 8 is a block diagram showing the adaptive flow limit circuit of FIG. 6 in greater detail, including an optimization module, according to some embodiments.

Referring now to FIG. 8, a block diagram 800 of adaptive flow limit circuit 636 is shown according to an exemplary embodiment. Adaptive flow limit circuit 636 is shown to include a sensor information module 802, a cost function module 804, an optimization module 806, and an uncertainty module 808. Sensor information module 802 is able to receive and store data from temperature sensors 708, 747, and 748. Sensor information module 802 is also able to receive and store data from flow rate velocity sensors 748. This data may be communicated to optimization module 806 either through either a wireless or wired network. Adaptive flow limit circuit 636 may be configured to perform a multi-objective optimization process to maximize comfort (or minimize discomfort) and to minimize energy usage.

Maximizing comfort means that the valve assembly (e.g., valve assembly 500, valve assembly 600, valve 746, etc.) that adaptive flow limit circuit 636 controls operates to follow a setpoint it receives from an external controller (e.g., from processing circuit 606 and/or adaptive flow limit circuit 636), even if this means the valve assembly operates in an energy-intensive manner. Minimizing energy usage means that the valve assembly uses the least amount of energy as possible, without taking into account occupant discomfort.

Cost function module 804 is configured to define an objective function that includes a cost or objective of using energy as well as a cost or objective associated with occupant discomfort, both of which are impacted by the threshold flow setting $\overline{m}$ (or the dimensional):

$$J = f(\text{cost}_{energy}, \text{cost}_{discomfort})$$

where:

$$\text{cost}_{energy} = f(\dot{V}_{max})$$

$$\text{cost}_{discomfort} = f(\dot{V}_{max})$$

according to some embodiments. In some embodiments, the variables or parameters of the objective function shown above are defined in Table 3 below:

TABLE 3

Objective Function Parameter Definitions

| Symbol | Name | Description |
| --- | --- | --- |
| J | Total cost/ objective | The value to be minimized by the optimization solver. |
| $\text{cost}_{energy}$ | Energy cost/ objective | The penalty associated with the coil's energy usage. |
| $\text{cost}_{discomfort}$ | Discomfort cost/ objective | The penalty associated with occupant discomfort. |
| $\dot{V}_{max}$ | Maximum or threshold flow | The adaptive threshold flow parameter that is enforced by the Energy Valve. This is the decision variable of the optimization problem. |

It should be understood that the term "cost" as used herein does not necessarily imply monetary values, but rather, represents a common scale that can be used to quantify and relate penalties associated with operating a coil (e.g., water coils 750) at a specific amount of energy-usage and occupant discomfort. It should be understood that comfort is only sacrificed when the valve assembly is limited to the threshold flow setting $\dot{V}_{max}$ (e.g., when operating at a value less than the threshold flow setting $\dot{V}_{max}$).

The objective function shown above determines the total "cost" associated with operating the valve assembly for various or different values of the threshold flow setting $\dot{V}_{max}$. The objective function can be used to evaluate both the cost or objective associated with the energy usage as well as the cost or objective associated with the occupant discomfort. In some embodiments, the threshold flow setting $\dot{V}_{max}$ is a decision variable of the objective function that can be selected, adjusted, chosen, etc., through an optimization process. The threshold flow setting $\dot{V}_{max}$ can be adjusted, determined, etc., to determine a minimum total cost or objective to optimize tradeoffs between energy usage and occupant comfort. Since the energy cost or objective $\text{cost}_{energy}$ (or $\text{obj}_{energy}$) and the discomfort cost or objective $\text{cost}_{discomfort}$ (or $\text{obj}_{discomfort}$) are coupled through the threshold flow setting $\dot{V}_{max}$ and typically compete with each other (e.g., decreased energy consumption is associated with higher occupant discomfort and vice versa), the objective function may define a multi-objective optimization problem.

Still referring to FIG. 8, cost function module 804 obtains user optimization priority setting 1002 from user interface 1000. Optimization priority setting 1002 allows the user to decide how they would like to prioritize energy efficiency and comfort which typically compete with each other. For example, if the user selects to prioritize energy efficiency, optimization module 806 may determine an adaptive flow rate that maximizes energy efficiency. Conversely, if the user selects to prioritize comfort, optimization module 806 will determine an adaptive flow rate that maximizes comfort. Optimization priority setting 1002 may be converted into a weighted parameter. The user can select to have the priority setting anywhere between solely prioritizing energy efficiency and comfort. Cost function module 804 determines the cost or objective of comfort and the cost or objective of energy using the weighted parameter. In one exemplary embodiment, the cost or objective can be expressed as an objective function in the form below:

$$J = \underbrace{(w_{comfort})\text{ Discomfort}}_{\text{cost}_{discomfort}} + \underbrace{(1 - w_{comfort})EnergyUse}_{\text{cost}_{energy}}$$

Still referring to FIG. 8, uncertainty module 808 determines quantifiable uncertainty associated with the adaptive ΔT vs flow model, according to some embodiments. This uncertainty can be due to both measurement uncertainty from sensor measurements and model-reality mismatch. The ΔT vs flow model uncertainty can be incorporated in optimization module 806 to supplement the calculation of the adaptive flow rate limit. For example, if there is a large amount of uncertainty in the model's relationship, then a strict adaptive flow rate limit should be relaxed because the model may not match the reality. This ensures that the adaptive flow rate limit may be flexible to expand to larger values to achieve comfort demands, according to some embodiments.

Figure 9:
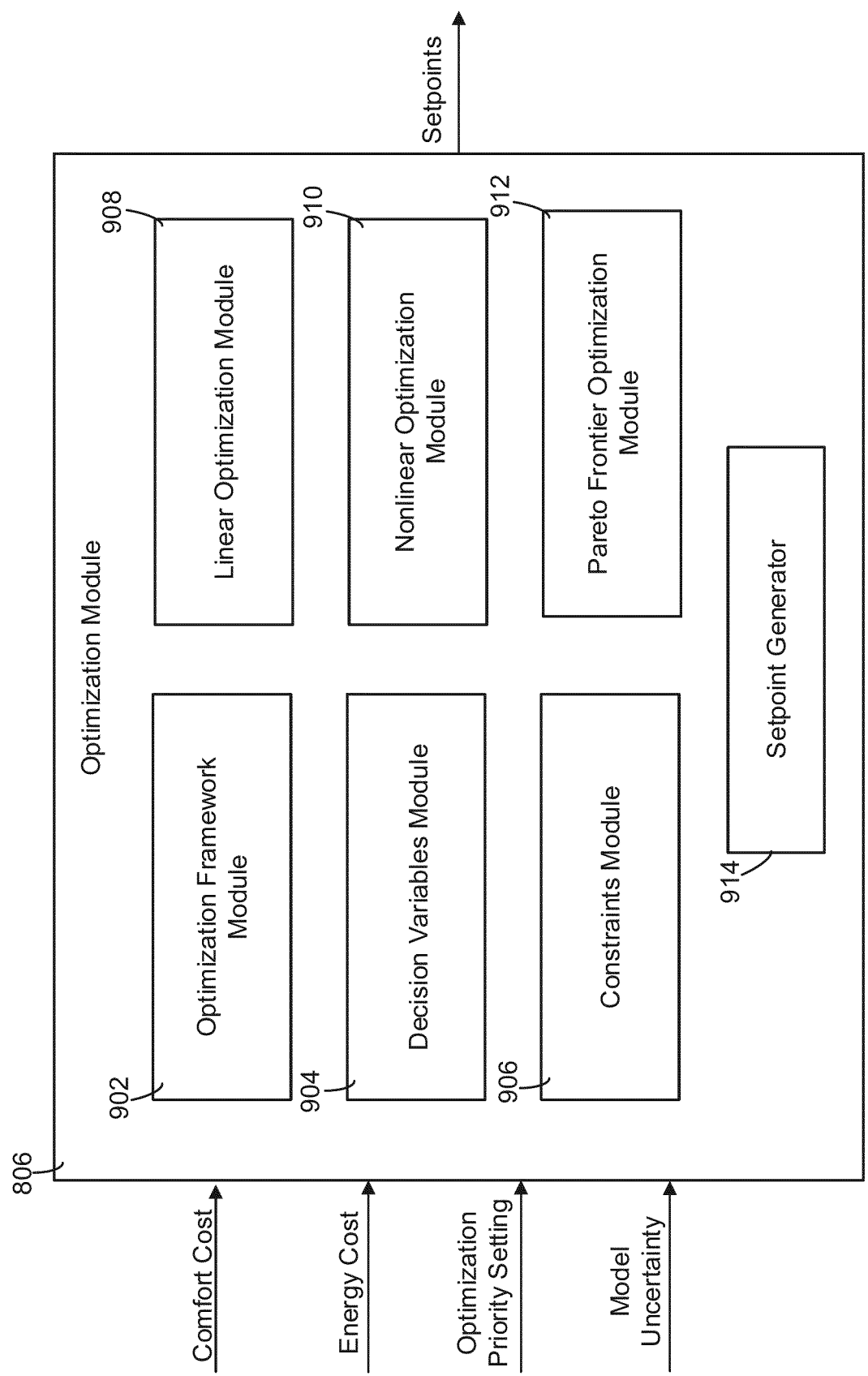
FIG. 9 is a block diagram showing the optimization module of FIG. 8 in greater detail, according to some embodiments.

Referring now to FIG. 9, optimization module 806 is shown to include decision variables module 904. Decision variables module 904 may be configured to store and manage the variables used in optimization module 806. For example, decision variables module 904 may store the optimization priority setting 1002, temperature sensor data from temperature sensors (708, 747, and 749), flow rate velocity data from sensor 748, cost parameters from 804, and model uncertainty parameters from 808. Constraints module 906 may store and impose explicit bounds on the ΔT vs flow model. For example, a minimum ΔT value may be imposed for the model.

Still referring FIG. 9, optimization module 806 is shown to include an optimization framework module 902. Optimization framework module 902 may be configured to select and/or establish an optimization framework for use in determining the adaptive threshold flow limit. In some embodiments, optimization framework module 902 may use a linear multi-objective optimization through the linear optimization module 908. For example, linear optimization module 908 define a linear relationship between various objectives (e.g. minimizing energy cost and minimizing comfort cost) In some embodiments, optimization framework module 902 may use a non-linear multi-objective optimization method within the non-linear optimization module 910. In some embodiments, the optimization framework module 902 may use a Pareto Frontier optimization method within the Pareto Frontier optimization module 912. Pareto frontier methods take all the scenarios/choices that are "Pareto-efficient" (i.e. optimal under various scenarios) and restricts the scope of the optimization problem to those choices. Some objective function is then used to determine the optimal tradeoff between the various objectives.

In an exemplary embodiment, setpoint generator 914 determines relevant setpoints (e.g. actuator position setpoints and flow rate velocity set points) based on either the linear optimization module 908, non-linear optimization module 910, or Pareto frontier optimization module in conjunction with data from the decision variables module and constraints module. Setpoints generated by setpoint generator 914 may be communicated to a variety of communication interfaces (e.g. 407, 612, 718, and 752).

Figure 10:
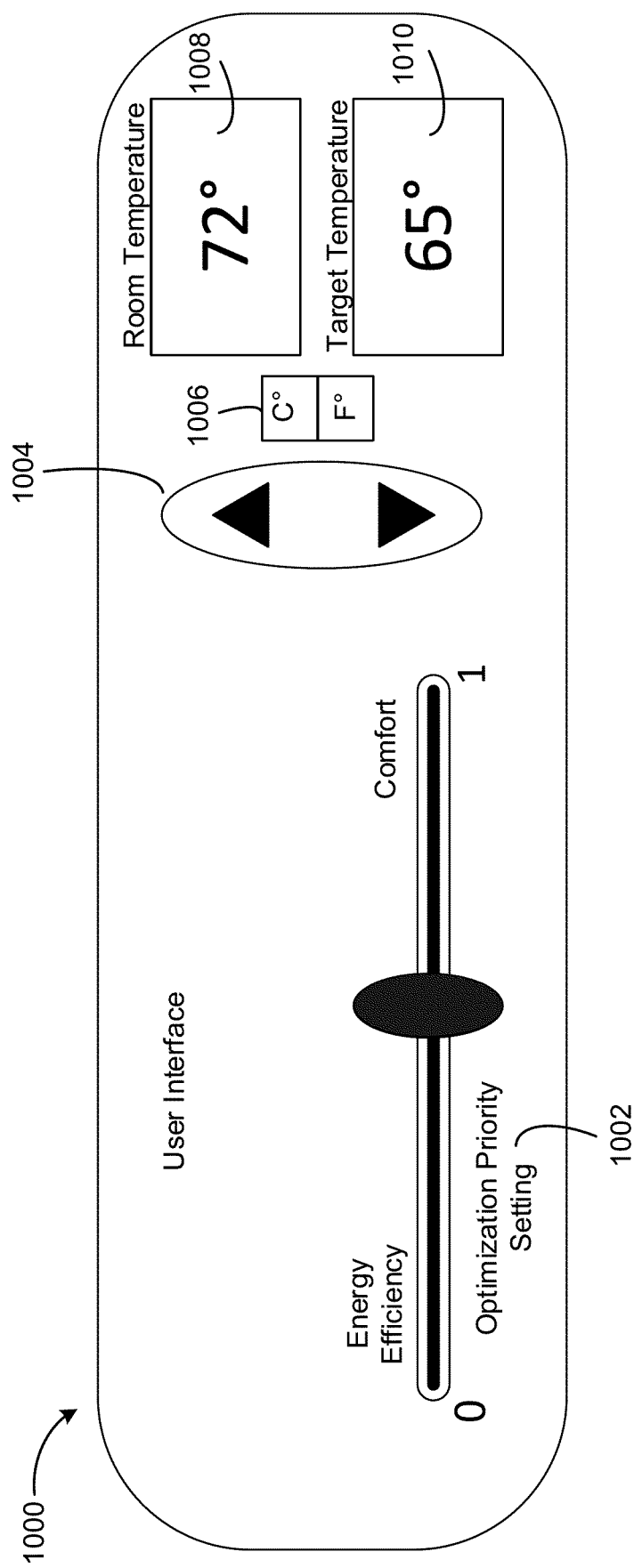
FIG. 10 is an illustration of a user interface usable with the adaptive flow limit circuit of FIG. 6, according to some embodiments.

Referring now to FIG. 10, a schematic of user interface 1000 is show according to an exemplary embodiment. User interface 1000 includes temperature displays 1008 and 1010, data entry elements 1004 and 1006, and optimization priority setting 1002. Optimization priority setting 1002 allows a user to set their priority setting anywhere between completely prioritizing energy efficiency or completely prioritizing comfort. The optimization priority setting can be translated into a weighted parameter for use in optimization module 806. In an exemplary embodiment, user interface 1000 displays current room temperature in display 1008 and the target temperature in display 1010. Data entry element 1006 is configured to display temperature in either Celsius or Fahrenheit temperature scales according to the user's preference. Data entry element 1004 is configured raise or decrease target temperature 1010.

Figure 11:
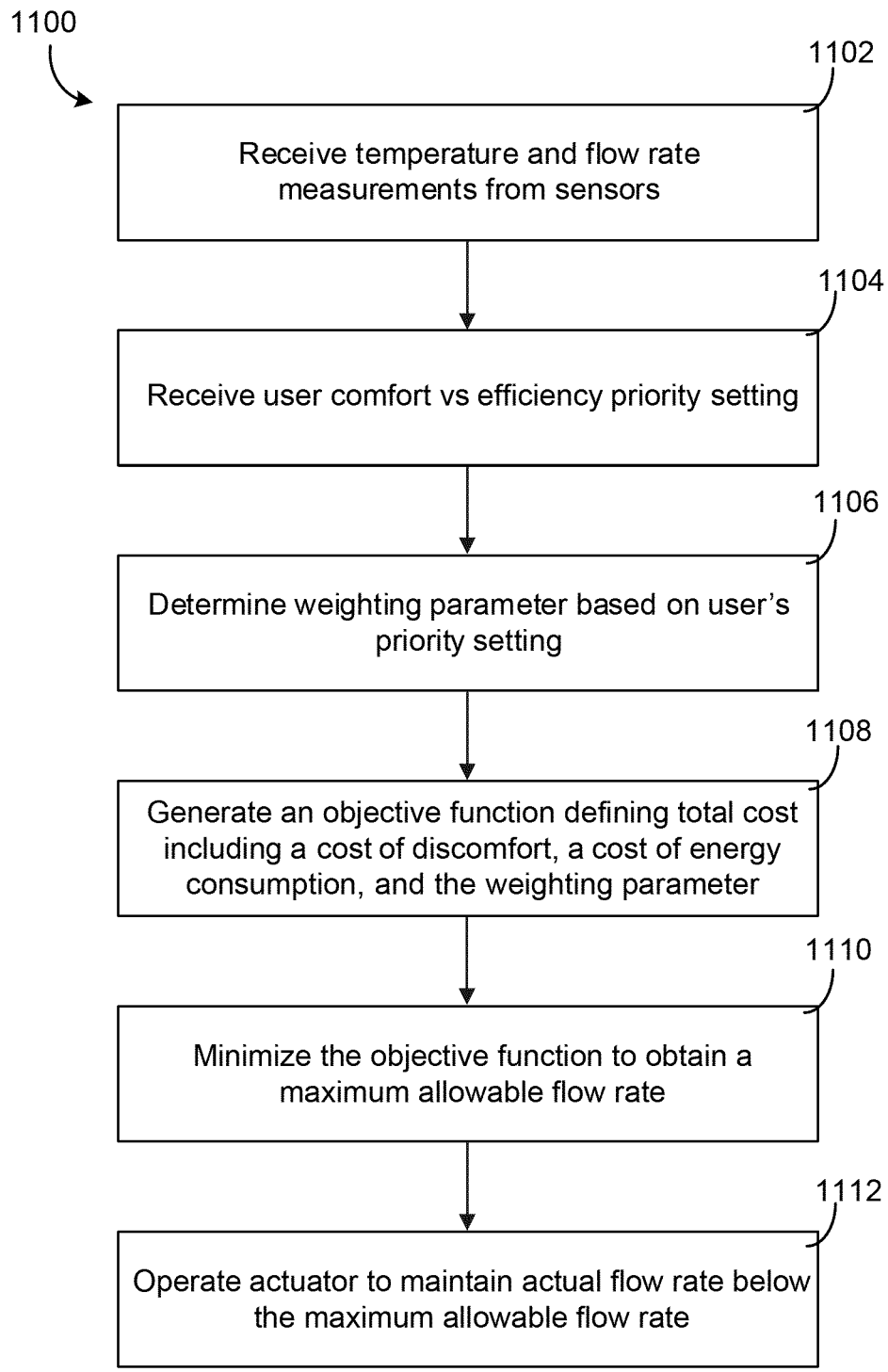
FIG. 11 is a flowchart of a process for determining a threshold flow rate of fluid through a heat exchanger to minimize an objective function and controlling a valve assembly using the threshold flow rate, according to some embodiments.

Referring now to FIG. 11, a flowchart of a process 1100 for determining the threshold flow rate (e.g., $\dot{V}_{max}$ and/or $\overline{m}_{max}$) is shown, according to some embodiments. In some embodiments, process 1100 is performed by a controller (e.g. main actuator controller 632, and more specifically within optimization module 806).

Process 1100 is shown to include receiving temperature and flow rate measurements from sensors 708, 747, 748, and 749 (step 1102). Temperature and flow rate measurement data may be used to create a ΔT vs flow model, provide data to feedback control system 700 and/or valve 746, and provide data to adaptive flow limit circuit 636. In some embodiments, step 1102 is performed by adaptive flow limit circuit 636.

Process 1100 includes receiving an optimization priority setting or a user comfort vs efficiency setting (step 1104), according to some embodiments. In some embodiments, the user comfort or optimization priority setting indicates a priority that the user places on efficiency of a heat exchanger versus a comfort in a conditioned space served by the heat exchanger. For example, the optimization priority setting or the user comfort setting may be a normalized value (e.g., a value from 0 to 1, a value from 0 to 100, etc.). In some embodiments, step 1104 is performed by optimization module 806 and the optimization priority setting or the user comfort vs efficiency setting is received from the user through user interface 1000.

Process 1100 includes determining a weighting parameter based on the user's priority setting (e.g., the optimization priority setting or the user comfort vs efficiency setting as received in step 1104) (step 11060, according to some embodiments. In some embodiments, the optimization priority setting can be translated into a weighted parameter for use in optimization module 806.

Process 1100 includes generating or obtaining an objective function that defines total cost or a total objective (e.g., an objective variable, an objective parameter, an optimization parameter, etc.) including a cost or objective of discomfort, a cost or objective of energy, and the weighting parameter (step 1108), according to some embodiments. In some embodiments, step 1108 is performed by optimization module 806. More specifically, step 1108 may be performed by optimization framework module 902. The objective function may evaluate both the cost or objective associated with the energy use of the heat exchanger, as well as the cost or objective associated with occupant discomfort. The threshold flow rate may be adjusted to determine a minimum total cost or a total objective (e.g., minimizing the objective function), thereby optimizing the tradeoff between energy use and occupant comfort. The objective function may take on a form such that a relationship can define the relative priority of the energy usage to the amount of discomfort using the weighting parameter obtained in step 1106 or received in step 1104.

Process 1100 includes determining a threshold flow rate using (step 1110) and operating an actuator to maintain an actual flow rate of fluid through the heat exchanger below the threshold flow rate (step 1112), according to some embodiments. In some embodiments, step 1110 is performed by linear optimization module 908 and/or nonlinear optimization module 910. Step 1110 is described in greater detail above with reference to FIG. 9, according to some embodiments. In some embodiments, step 1112 is performed by valve assembly 500, valve assembly 600, and/or valve 746.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An adaptive flow limit controller for controlling a flow rate of a fluid through a heat exchanger, the controller comprising a processing circuit configured to:
    use an adaptive model to determine a threshold flow rate of the fluid through the heat exchanger at which a gradient of a temperature difference of the fluid across the heat exchanger with respect to the flow rate of the fluid through the heat exchanger has a threshold gradient value; and
    operate at least one of a valve, damper, fan, pump, or actuator to maintain the flow rate of the fluid of through the heat exchanger at less than or equal to the threshold flow rate.

2. The adaptive flow limit controller of claim 1, wherein the adaptive model defines a relationship between the temperature difference of the fluid across the heat exchanger and the flow rate of the fluid through the heat exchanger as a function of an adaptive model parameter.

3. The adaptive flow limit controller of claim 1, wherein the processing circuit is configured to update an adaptive model parameter of the adaptive model using one or more measurements of the temperature difference of the fluid across the heat exchanger and the flow rate of the fluid through the heat exchanger.

4. The adaptive flow limit controller of claim 1, wherein the gradient of the temperature difference of the fluid across the heat exchanger with respect to the flow rate of the fluid through the heat exchanger is a function of both the flow rate of the fluid through the heat exchanger and an adaptive model parameter of the adaptive model such that:
    the threshold gradient value corresponds to a first threshold flow rate of the fluid through the heat exchanger when the adaptive model parameter has a first parameter value; and
    the threshold gradient value corresponds to a second threshold flow rate of the fluid through the heat exchanger, different from the first threshold flow rate, when the adaptive model parameter has a second parameter value different from the first parameter value.

5. The adaptive flow limit controller of claim 1, wherein the threshold gradient value is a predetermined value stored in memory of the adaptive flow limit controller.

6. The adaptive flow limit controller of claim 1, wherein the processing circuit is configured to generate the threshold gradient value as a function of:
    a first gradient value that prioritizes energy consumption and corresponds to a first temperature difference of the fluid across the heat exchanger; and
    a second gradient value that prioritizes occupant comfort and corresponds to a second temperature difference of the fluid across the heat exchanger, the second temperature difference being less than the first temperature difference.

7. The adaptive flow limit controller of claim 1, wherein the processing circuit is configured to generate the threshold gradient value as a function of a user-adjustable weight that indicates a priority of energy consumption relative to occupant comfort.

8. A method for controlling a flow rate of a fluid through a heat exchanger, the method comprising:
    using an adaptive model to determine a threshold flow rate of the fluid through the heat exchanger at which a gradient of a temperature difference of the fluid across the heat exchanger with respect to the flow rate of the fluid through the heat exchanger has a threshold gradient value; and
    operating at least one of a valve, damper, fan, pump, or actuator to maintain the flow rate of the fluid of through the heat exchanger at less than or equal to the threshold flow rate.

9. The method of claim 8, wherein the adaptive model defines a relationship between the temperature difference of the fluid across the heat exchanger and the flow rate of the fluid through the heat exchanger as a function of an adaptive model parameter.

10. The method of claim 8, further comprising updating an adaptive model parameter of the adaptive model using one or more measurements of the temperature difference of the fluid across the heat exchanger and the flow rate of the fluid through the heat exchanger.

11. The method of claim 8, wherein the gradient of the temperature difference of the fluid across the heat exchanger with respect to the flow rate of the fluid through the heat exchanger is a function of both the flow rate of the fluid through the heat exchanger and an adaptive model parameter of the adaptive model such that:
    the threshold gradient value corresponds to a first threshold flow rate of the fluid through the heat exchanger when the adaptive model parameter has a first parameter value; and
    the threshold gradient value corresponds to a second threshold flow rate of the fluid through the heat exchanger, different from the first threshold flow rate, when the adaptive model parameter has a second parameter value different from the first parameter value.

12. The method of claim 8, wherein the threshold gradient value is a predetermined value stored in memory of the adaptive flow limit controller.

13. The method of claim 8, further comprising generating the threshold gradient value as a function of:
    a first gradient value that prioritizes energy consumption and corresponds to a first temperature difference of the fluid across the heat exchanger; and
    a second gradient value that prioritizes occupant comfort and corresponds to a second temperature difference of the fluid across the heat exchanger, the second temperature difference being less than the first temperature difference.

14. The method of claim 8, further comprising generating the threshold gradient value as a function of a user-adjustable weight that indicates a priority of energy consumption relative to occupant comfort.

* * * * *